(12) United States Patent
Fox

(10) Patent No.: US 11,861,744 B2
(45) Date of Patent: ***Jan. 2, 2024

(54) SYSTEMS AND METHODS FOR COORDINATING ORDERING BETWEEN MOBILE DEVICES

(71) Applicant: Blue Baker, LLC, College Station, TX (US)

(72) Inventor: David C. Fox, College Station, TX (US)

(73) Assignee: Blue Baker, LLC, College Station, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/111,322

(22) Filed: Feb. 17, 2023

(65) Prior Publication Data

US 2023/0206358 A1 Jun. 29, 2023

Related U.S. Application Data

(63) Continuation-in-part of application No. 17/532,077, filed on Nov. 22, 2021, which is a continuation of application No. 16/504,123, filed on Jul. 5, 2019, now Pat. No. 11,182,864, which is a continuation-in-part of application No. 15/168,952, filed on May 31, 2016, now Pat. No. 10,402,920.

(60) Provisional application No. 62/191,772, filed on Jul. 13, 2015.

(51) Int. Cl.
  *G06Q 50/12* (2012.01)
  *G06Q 30/0601* (2023.01)
  *G06Q 20/18* (2012.01)

(52) U.S. Cl.
  CPC .......... *G06Q 50/12* (2013.01); *G06Q 30/0621* (2013.01); *G06Q 30/0635* (2013.01); *G06Q 30/0641* (2013.01)

(58) Field of Classification Search
  CPC ............... G06Q 50/12; G06Q 30/0621; G06Q 30/0635; G06Q 30/0641; G06Q 30/0633
  USPC ......................................................... 705/15
  See application file for complete search history.

(56) References Cited

U.S. PATENT DOCUMENTS

| | | |
|---|---|---|
| 5,969,968 A | 10/1999 | Pentel |
| 6,366,220 B1 | 4/2002 | Pentel |
| 6,425,524 B2 | 7/2002 | Pentel |
| 6,585,516 B1 | 7/2003 | Alabaster |
| 6,940,393 B2 | 9/2005 | Dev et al. |
| 7,895,797 B2 | 3/2011 | Bridgman et al. |
| 7,992,355 B2 | 8/2011 | Bridgman et al. |
| 8,059,029 B2 | 11/2011 | Juang |
| 8,190,483 B2 | 5/2012 | Woycik et al. |
| 8,280,775 B2 | 10/2012 | Armstong |
| 8,650,095 B1 | 2/2014 | Shimoff et al. |

(Continued)

FOREIGN PATENT DOCUMENTS

| | | |
|---|---|---|
| CN | 103745266 A | 4/2014 |
| DE | 10338155 A1 | 7/2004 |

(Continued)

*Primary Examiner* — Garcia Ade
(74) *Attorney, Agent, or Firm* — Dickinson Wright PLLC; Stephen A. Mason; Jonathan H. Harder

(57) ABSTRACT

Systems and restaurant locations for use with a coordinated mobile ordering system, and methods thereof, to provide at least more time-efficient pick up of orders by customers than with traditional ordering and pick up windows.

20 Claims, 25 Drawing Sheets

(56) References Cited

U.S. PATENT DOCUMENTS

| | | |
|---|---|---|
| 8,660,906 B2 | 2/2014 | Woycik et al. |
| 2002/0138350 A1 | 9/2002 | Cogen |
| 2003/0046166 A1 | 3/2003 | Liebman |
| 2005/0108097 A1 | 5/2005 | McAleenan |
| 2006/0006025 A1 | 1/2006 | Dev et al. |
| 2006/0085266 A1 | 4/2006 | Wei et al. |
| 2006/0218043 A1 | 9/2006 | Rosenzweig et al. |
| 2006/0293971 A1 | 12/2006 | Hunter et al. |
| 2007/0061209 A1 | 3/2007 | Jackson |
| 2009/0204492 A1 | 8/2009 | Scifo et al. |
| 2009/0319381 A1 | 12/2009 | Armstrong |
| 2010/0106607 A1 | 4/2010 | Riddiford et al. |
| 2012/0209730 A1 | 8/2012 | Garrett |
| 2013/0024299 A1 | 1/2013 | Wong et al. |
| 2014/0100971 A1* | 4/2014 | Klearman .............. G06Q 50/12 705/15 |
| 2016/0244311 A1* | 8/2016 | Burks .................... G06Q 20/18 |

FOREIGN PATENT DOCUMENTS

| | | |
|---|---|---|
| EP | 2102801 A1 | 9/2009 |
| WO | 1999054808 A1 | 10/1999 |
| WO | 2009126266 A3 | 10/2009 |

\* cited by examiner

SYSTEMS AND METHODS FOR COORDINATING ORDERING BETWEEN MOBILE DEVICES

CROSS-REFERENCE TO RELATED APPLICATION

This application is a continuation-in-part of patent application Ser. No. 17/532,077 filed Nov. 22, 2021, which is a continuation of patent application Ser. No. 16/504,123 filed Jul. 5, 2019, which is a continuation-in-part of patent application Ser. No. 15/168,952 filed May 31, 2016, which claims the benefit of Provisional Patent Application Ser. No. 62/191,772 filed Jul. 13, 2015.

FEDERALLY SPONSORED RESEARCH

Not Applicable.

SEQUENCE LISTING

Not Applicable.

BACKGROUND

Customers of restaurants, especially to-go customers, do not wish to wait to pick up their food. In particular, customers who have pre-ordered their meals do not wish to be trapped in line waiting for other customers to order, or waiting on a larger order to be cooked and completed before picking up their food. This problem is especially pronounced as customers expand their expectations for more efficient pick up beyond fast food restaurants and to higher end restaurants.

For example, for fast casual and casual dining restaurants that offer customers the ability to pick up ordered food from a delivery or pick up window, time is of special importance. Customers do not wish to wait.

As another example, multiple customers of a restaurant may want to order food to dine together as a group, but are located in different areas prior to ordering. In the typical mobile ordering process, each customer has to place a separate order from his or her respective device, which often leads to different times at which each customer receives his or her respective food. As a result, in such situations, some customers have to wait significant periods of time to eat their food, which leaves the food that was prepared earlier getting cold, soggy, or otherwise sub-optimal compared to when it was first ready for pick-up. Alternatively, certain customers in the group order may end up having to wait without food while the rest of their group dines. Moreover, in such examples, the restaurant is hindered as well since a single customer picking up food for a group may linger at a restaurant location until each food order is prepared. In such an example, if one order for the group is ready significantly earlier than another order that was placed by a member of the group, then the customer picking up the food will wait in the queue or stay in a parking spot until the later order is done being prepared, which will slow the turn-over rate of parking spaces at the restaurant.

FIELD OF THE DISCLOSURE

This disclosure relates to drive-through, pick up, and delivery ordering and delivery systems and methods for restaurants.

Additionally, in another embodiment, the disclosure relates to ordering systems and methods for restaurants that can allow multiple customers to place a singular coordinated order for drive-through, pick up, delivery, or dine in.

DESCRIPTION OF THE RELATED ART

For many restaurants the preparation time significantly varies between menu items, and order completion time is determined by multiple dynamic variables: staffing levels, staff position training, staff skill levels, prior orders in progress, inventory on hand, order size, order complexity, and by the longest preparation time of any one item on an order.

In customary drive-through restaurants, customers are served in the sequence of order placement or arrival at the restaurant order queue (a sequential, linear queue) so there can be a significant wait in a queue for delivery of an order even if the preparation time is short, because the delivery is made in the sequence of orders received; not when the orders are ready for pick up. This results at least partially from the arrangement of drive-through parking lots with sequential drive lanes. Moreover, considerable time is typically spent in payment at the pick-up window.

Additionally, groups that plan to dine together (i.e., pick up food from the same restaurant to eat together) can often be located in different areas prior to dining together. In such an instance, when having to place the order, the customers are either responsible for coordinating the specific menu determinations prior to placing the order at the restaurant (placing the burden on the customers) or individually ordering each customers food in a separate order that will later be picked up by a member of the group.

In customary restaurants, customers are each responsible for placing individual mobile orders for their food, which are then prepared and served in the sequence of order placement—resulting in a linear ordering system. Accordingly, if one person in a group that plans to dine together places a mobile order earlier than another person in the same group, there can be a significant wait between the times that the related orders are ready for pick up. Further, if a single customer associated with the group is responsible for picking up the entire group order, the customer may have to wait long periods of time at the restaurant to receive each prepared order.

What is needed is a system or methods which solves these time-wasting problems and allows customers the convenience of a more efficient drive through window, while potentially being served a higher quality menu (such as that typically found in fast casual and casual restaurants), which requires longer food preparation times, and further can allows customers to receive a more reliable expectation of order completion.

BRIEF SUMMARY OF THE DISCLOSURE

This disclosure is, in general embodiments, a restaurant location for use with an ordering system with production timing and slip logic, and restaurant locations configured to provide non-sequential pick up of orders as the orders are ready, and methods for use thereof. The present disclosure provides at least more time-efficient pick up of orders by customers than with traditional ordering and pick up windows.

This disclosure is also, in general embodiments, an ordering system for use at a business location that is configured to receive multiple orders from different customers, and join the multiple orders into a singular ticket based on use of the same order code, for delivery, dine-in, drive thru, or pick-up from the business location, and methods for use thereof. The present disclosure provides at least more time-efficient orders by multiple customers that are eating together but plan to order or pay separately than with traditional restaurant ordering processes.

BRIEF DESCRIPTION OF THE DRAWINGS

Various embodiments of the present disclosure are described with reference to the following FIGURES. Like reference numerals therein refer to like parts throughout the various views unless otherwise specified. Embodiments and portions of embodiments illustrated and described herein are non-limiting and non-exhaustive.

DETAILED DESCRIPTION OF THE DISCLOSURE

Figure 1:
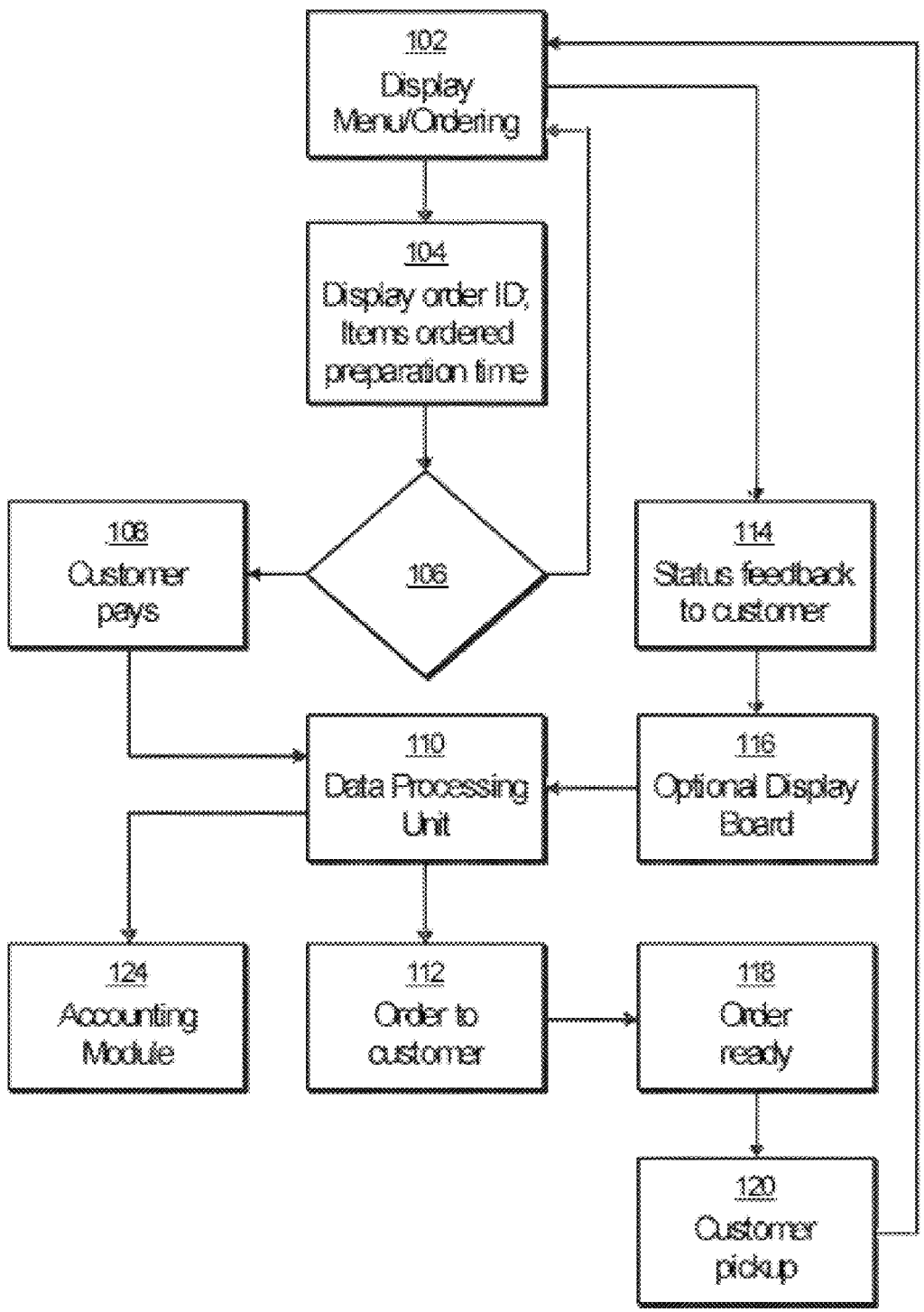
FIG. 1 is a flow diagram of the process of an embodiment of the disclosure.

The following description of various embodiments of the disclosure, combined with the associated drawings, enables persons of ordinary skill in the art to both practice the preferred embodiments of the disclosure, and to understand related applications and embodiments of the disclosure that may not be specifically set forth, but are encompassed by the specification and claims.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or a direct connection. Thus, if a first device couples to a second device, that connection may be through a direct connection or through an indirect connection via other devices and connections.

The terminology used herein is for the purpose of describing particular example embodiments only, and is not intended to be limiting. As used herein, the singular forms "a," "an," and "the" may be intended to include the plural forms as well, unless the context clearly indicates otherwise. The method steps, processes, and operations described herein are not to be construed as necessarily requiring their performance in the particular order discussed or illustrated, unless specifically identified as an order of performance. It is also to be understood that additional or alternative steps may be employed.

The terms first, second, third, etc. may be used herein to describe various elements, components, regions, layers and/or sections; however, these elements, components, regions, layers and/or sections should not be limited by these terms. These terms may be only used to distinguish one element, component, region, layer, or section from another region, layer, or section. Terms such as "first," "second," and other numerical terms, when used herein, do not imply a sequence or order unless clearly indicated by the context. Thus, a first element, component, region, layer, or section discussed below could be termed a second element, component, region, layer, or section without departing from the teachings of the example embodiments. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. In another example, the phrase "one or more" when used with a list of items means there may be one item or any suitable number of items exceeding one.

Spatially relative terms, such as "inner," "outer," "beneath," "below," "lower," "above," "upper," "top," "bottom," and the like, may be used herein. These spatially relative terms can be used for ease of description to describe one element's or feature's relationship to another element(s) or feature(s) as illustrated in the figures. The spatially relative terms may also be intended to encompass different orientations of the device in use, or operation, in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptions used herein interpreted accordingly.

While the making and using of various embodiments of the present disclosure are discussed in detail below, it should be appreciated that the present disclosure provides many applicable inventive concepts that can be embodied in a wide variety of specific contexts, goods, or services. The specific embodiments discussed herein are merely illustrative of specific ways to make and use the disclosure and do not delimit the scope of the disclosure.

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The following detailed description is, therefore, not intended to be taken in a limiting sense.

General Embodiment

This disclosure is, in general embodiments, a restaurant location for use at least with a mobile ordering system to provide at least more time-efficient pick up of orders by customers than with traditional ordering and pick up windows.

This disclosure is, in some embodiments, a restaurant location for use at least with a mobile ordering system, comprising a restaurant building (which is, in various embodiments, a building, multiple buildings, a food truck, a food stand, some other discrete physical restaurant structure, or a combination thereof) having an order pick up window and associated order pick up area configured only for pick-up of pre-paid orders. In some such embodiments, the restaurant location further comprises a parking lot at least partially around the building, and having a drive-through lane that allows vehicles to pull adjacent to the order pick up window. In some embodiments, the restaurant location also comprises a plurality of queuing spaces, being parallel, single-vehicle, parking spaces in the parking lot, each queuing space opening directly into the drive-through lane such that each queuing space provides independent, non-sequential access to the drive-through lane. In some embodiments, the restaurant location further comprises an order status display positioned and sized to be visible both to customers in the queuing spaces, and to customers in or approaching the drive-through lane but not yet approaching the order pick up window.

In some embodiments, each queuing space opens directly into at least one drive-through lane such that each queuing space provides independent, non-sequential access to that space's drive-through lane, the order status display is positioned and sized to be visible to customers in the queuing spaces and to customers in or approaching a drive-through lane but not yet approaching the order pick up window; and a merging means to direct vehicles from the several drive-through lanes to approach the order pick up window.

In some embodiments, the restaurant location comprises at least one drive-through order placement station separate from and before the order pick up window and placed accessible from at least one drive-through lane.

The present system and methods provide a significant advantage in accurate expected wait times. In particular, it provides an advantage over the typical requirement for customers that desire an estimated wait time to call or walk-in to the restaurant location, and receive a mentally calculated estimate from wait staff. The current order system allows customers to receive an estimated order-ready time before placing their order and without having to directly contact the restaurant.

Furthermore, it allows a more accurate order ready time, instead of either being inconvenienced by an over-ambitious estimate that is too short and requires the customer to wait longer than expected, or by an overly-conservative estimate that unnecessarily discourages the customer from ordering.

In some embodiments, wait staff greet the customer by name, verbally confirm the order, or some combination thereof, before handing the order to the customer. The ordering system and non-sequential pick up does not eliminate human interaction. Instead, it minimizes frustrating human interaction (such as trying to accurately place an order over a drive-through microphone), and allows the human interaction to be more positive, such as greeting a customer by name and with a smile, and handing a fresh, accurate order to a customer.

This present disclosure is, in general embodiments, an ordering system for use at least with one or more restaurant customers' mobile computing devices to provide at least more time-efficient pick up of an order involving multiple customers than with traditional ordering and pick up practices.

This present disclosure is, in one embodiment, a computer-implemented method including receiving, by a computing device, over a network, one or more contact information pertaining to one or more customers; receiving a selection of a restaurant to initiate an order for the one or more customers; transmitting, via the computing device and based on the one or more contact information, one or more notifications to one or more customer computing devices associated with the one or more customers, wherein the one or more notifications comprises a prompt to at least a menu associated with the restaurant; receiving, by the computing device, one or more selections of items ordered from the menu associated with the restaurant; and transmitting, by the computing device, the one or more selections of items included in the order to a computing device associated with the restaurant to cause the items to be prepared.

The present system and methods provide a significant advantage in accurate expected wait times. In particular, it provides an advantage over the typical requirement for customers that desire an estimated wait time to call or walk-in to the restaurant location, and receive a mentally calculated estimate from wait staff. The current order system allows customers to receive an estimated order-ready time before placing their order and without having to directly contact the restaurant.

Exemplary Advantages

Various embodiments of the present present disclosure provide a multitude of advantages over current ordering, production, and delivery systems. A non-exhaustive, non-limiting, list of example advantages of some embodiments are provided hereafter.

Menu Quality

In various embodiments, the system and process presented herein provide restaurants the ability to offer customers a combination of a higher quality menu typically associated with greater wait times, and the ordering and pick up convenience typically associated with lower quality fast food menus. Heretofore, restaurants with a high percentage of drive-through orders (typically greater than fifty percent) had to restrict their menu to orders that could be prepared quickly to prevent the line growing uncontrollably and excessive wait times between order placement and order pick up.

The present system and methods allow the longer preparation times, such as is necessary in 'home-cooking,' in healthier menus, and in more customized or more variable menus, to be accounted for while preserving customer convenience, by pre-ordering. It also allows the greater variations in preparation times associated with a varied menu to be accounted for by a production timing and slip-logic order system. Accordingly, the restaurant prepares orders more efficiently, eliminating inefficiencies in order preparation time, orders not ready when expected, and orders ready substantially before expected. The greater efficiency allows the effect of longer preparation times to be minimized by removing 'overhead' time that was lost in inefficiency in previous systems and methods, thereby reducing the impact of the longer preparation time on the time-to-ready that affects customers.

Customer Interaction and Convenience

Embodiments of the present disclosure provide further advantages in accommodating customer personalities, moods, etc., and in providing customers with a more relaxed and friendly order placement and pick up experience. In particular, the ability to pre-order on a mobile device, computer, or kiosk, allows a customer to explore the menu at their leisure instead of being pressured to quickly make decisions by other customers waiting behind them, or by a hurried wait staff waiting to receive their order. Indeed, in a prototype embodiment of an embodiment of this disclosure using a non-sequential order pick up lane and window, and a mobile ordering system, it was found that mobile orders resulted in an increased engagement of customers with the menu, increased amount of time customers spent creating an order, a greater level of customization, and an increased number of menu options added to orders.

Many customers are uncomfortable with excessive interaction: they may feel awkward, they may fear engaging a new restaurant because they are not familiar with it, they may tend to be introverted and prefer limiting unnecessary engagement with random people, they may have had a stressful day and not feel like the extra effort to engage people at the moment, they may be in a hurry and find it more efficient to interact with a device as it is convenient for them rather than dedicating the time to go place their order in person, etc. Whatever the reason, allowing pre-ordering, especially through a website, mobile device, etc. allows the customer to place an order without a) the stress of interacting with an often hurried order taker, and b) dedicating the time to place an order and wait for order preparation. The combination of slip-logic queuing, accurate estimation of order ready time, and notifying customers when the order is ready, enables pre-ordering to work smoothly and efficiently, without previous problems associated with pre-ordering, such as customers forgetting their order, losing track of time, or having to 'activate' their order upon arrival and wait for the order to be prepared.

Embodiments of the present disclosure offer distinct advantages to customers in convenience and speed, as referred to elsewhere herein. An order pick up window(s) configured solely for pre-orders, especially mobile orders, alleviates the frustration to a customer of pre-ordering, and then being trapped in line behind non pre-orders. Additionally, pre-ordering through a customer-centric mobile application or website allows convenient re-ordering. For example, if a customer regularly places one or several orders, the customer is able, in some embodiments, to access their account and simply 're-order' instead of having to build the order time and time again, or to verbally dictate their order again and again to an order taker at a drive-through location.

Restaurant Advantages

Furthermore, embodiments of the present disclosure provide advantages to restaurants in increasing order accuracy, increasing customer service, and improving the working environment for staff, thereby contributing to a better experience for customers. In particular, the removal of microphones from the order pick up lane and window, in combination with mobile and online orders, reduces the stress of understanding customer's verbal orders, increases order accuracy and so decreases customer tension over inaccurate orders, and allows wait staff to greet customers picking up their orders with a friendly, un-harried, smile and greeting. The reduction or elimination of phone calls seeking information and placing orders over the phone (due in part to direct mobile and online orders, and due in part to the ordering system, discussed elsewhere, allowing calls to be taken at a quiet, central location) reduces the stress on wait staff, and allows phone conversations to be in a quiet and calm environment without the background noise of a busy restaurant environment.

Mixed Pre-Order and In-Line Ordering

Additionally, the present system and methods provide an advantage over various systems and methods that seek to improve upon fast food ordering by taking pre-orders, and then mixing pre-order customers and customers ordering in-line in the same order and pick up line(s). In various embodiments, taking orders over a mobile device or other internet-enabled device, calculating an accurate order-ready time, and managing order-prep start time with the slip-logic order management system allows the customer to order when convenient, and pick up when convenient, avoiding extended wait times and making a higher quality menu actually faster for the customer than present fast-food systems and methods. As customers demand higher quality menus, and menus including healthier options, such a system and methods are particularly advantageous to customers and restaurants alike.

Similarly, the present system and processes also provide an advantage over systems and methods that take pre-orders, but provide no dynamic order queuing, production timing, or slip-logic, such that large or slow orders may interfere with expected wait times, and small or fast orders may sit abnormally long before the customer picks them up. Again, the present system and methods also provide an advantage over systems and methods that take pre-orders but, in order to maximize order freshness, require the customer to 'activate' or 'confirm' the order upon reaching the restaurant location, effectively eliminating the advantage of pre-ordering to avoid the wait of order preparation. The present systems and methods, thus, capitalize on the advantages of pre-ordering, rather than effectively putting pre-orders in the same preparation position as if the orders were placed at the window.

Non-Sequential Linear Access

The present disclosure offers multiple advantages over drive-in restaurants with multiple parallel ordering and pick up spaces. Non-sequential customer access to a drive-through window(s) maximizes efficiency of wait staff, preventing the necessity of constantly carrying orders to a plurality of locations. Additionally, non-sequential customer access to a drive-through window(s) maximizes convenience and time savings for customers, eliminating the need to wait at a particular location for the order to be prepared—an especial advantage over restaurants where the customer places and receives the order at the same window or parking space, and has to wait thereat during preparation.

Efficiency

Some embodiments have the benefit of improving efficiency. For example, a vendor receiving a plurality of orders that are grouped together in accordance with some embodiments of the present disclosure may determine that each of the plurality of orders need not be ready until the last of the plurality of orders is ready. In this way, some embodiments, may permit vendors to determine when to start cooking items that take less time to prepare.

In some examples, one order in the plurality of orders grouped together may take an hour to prepare whereas another order takes just ten minutes; some embodiments may permit the vendor to determine the two orders are grouped together. Therefore, some embodiments will encourage the vendor to begin preparing the order that takes an hour to make immediately but wait fifty minutes to begin preparing the order that takes just ten minutes to prepare. Such embodiments have the benefit of promoting efficiency in the form of improving the quality of the product ultimately delivered to the customer. In some embodiments, such efficiency may take the form of producing a fresher or hotter product to the customer than would otherwise be possible.

Additionally, some embodiments of the present disclosure have the benefit of improving efficiency by decreasing deliveries. For example, some embodiments may involve delivering the plurality of orders. In such examples, the present disclosure may have the benefit of minimizing deliveries, reducing deliveries, or permitting all orders to be delivered via a single delivery.

Additionally, some embodiments of the present disclosure improve efficiency by permitting vendors to focus on higher priority action items that might otherwise not be recognized as higher priority action items. For example, in some embodiments, if a plurality of orders arrives at a vendor and includes one order that takes an hour to make and another order that takes just ten minutes, the vendor's staff need not divert resources and time to the another order until fifty minutes have passed. In such embodiments, the vendor may then spend resources (including time) on matters that truly need to be completed or addressed before the fifty minute time period has elapsed.

Some embodiments of the present disclosure therefore have the benefit of increasing efficiency in the form of setting more accurate expectations regarding the time it will take for products to arrive, providing a fresher, more enjoyable, or higher quality product, and allowing vendors to better allocate their time upon receiving an order grouped in accordance with one or more embodiments of the present disclosure.

Coordination

Some embodiments have the benefit of improving coordination or reducing friction associated with coordinating between two or more customers. In examples of such embodiments, two or more customers may each individually order from a given vendor rather than having to resort to communicating each of the orders associated with the two or more customers to one of the two or more customers, where the one of the two or more customers then submits the order via their mobile device. Because some embodiments eliminate the requirement that two or more customers all order from a single device, such embodiments improve coordination between the two or more customers.

Additionally, because each of the two or more customers purchases their order from their mobile device, some embodiments may eliminate the need to coordinate payment after the order has been delivered. For example, some embodiments may eliminate the need for a single user of the two or more customers to divide an aggregate bill into two or more individualized bills based on what each of the two or more users ordered. Consequently, some embodiments improve coordination by eliminating the need for certain steps to be performed among two or more users that have the potential or likelihood of causing social conflict. Additionally, some embodiments of the present disclosure may have the benefit of improving coordination with a vendor from which the two or more customers purchase one or more orders. For example, if a vendor receives a plurality of orders that are grouped together in accordance with some embodiments of this disclosure, then the vendor may determine a single wait time associated with the plurality of orders based on when the last order in the plurality of orders will be ready. Thus, such embodiments have the benefit of communicating to the two or more customers when their order will most likely arrive, thereby decreasing potential conflicts with the vendor.

Retention of Customer Information

Some embodiments have the benefit of permitting the retention of customer information. Customer information is a highly sought after and valuable commodity to a variety of companies. In some embodiments, the system may more accurately determine whether two or more persons are ordering together by having access to and maintaining customer information as to the two or more persons. This provides a strong incentive, in some embodiments, for customers to agree to allow their customer information to be retained. In turn, some embodiments may include prompting the user to permit the retention of customer information. In examples of such embodiments, the user—when prompted to give permission to the retention of their customer information—may be informed of the benefits that such information provides to some embodiments.

Additionally, such permission may include the right to convey, sell, or disclose such customer information to third-parties. In some embodiments, the sale, conveyance, or disclosure of customer information may be based, in part, on the customer information. In such embodiments, the sale, conveyance, or disclosure of customer information to a third-party may be based on a comparison of the customer information with the information retained about the third-party. Some embodiments may utilize machine learning to perform this comparison. In some embodiments, a neural network, with one or more hidden layers, may be used to determine whether a particular third-party in a set of third-parties is the best match among the set of third-parties for the sale, disclosure, or conveyance of the customer information.

Therefore, some embodiments have the benefit of encouraging users to consent to the retention of their customer information; in turn, such retention of information has the benefit of improving performance of some embodiments and generating an additional revenue stream for administrators of some embodiments.

Versatility

Some embodiments have the benefit of allowing increased versatility. Some embodiments may identify whether two or more orders are grouped together using a variety of means. For example, some embodiments may determine that two or more customer orders are grouped together by receiving as an input, the IP address from which each of the orders is received and the vendor to which the orders are sent. For example, some embodiments may permit several guests at a social gathering at a single house to place several orders to one vendor and determining, based on the single IP address used by the several guests to place each of their orders, that the several orders of the several guests should be grouped together.

Additionally, two or more customers at diverse locations may decide between themselves to dine-in at a particular vendor. Some embodiments of the present disclosure may group orders received from the two or more customers based on the historical tendency of the two or more customers to dine together. Some embodiments may determine that two or more orders ought to be grouped together despite receiving as an input location information indicating that the two or more customers are very far apart from one another. Some embodiments may leverage machine learning models and neural networks for order prediction. In some embodiments, as a quality assurance check, two or more customers may receive a prompt asking each user to verify whether they would like their order to be grouped with the two or more customers identified as potentially part of their group. Thus, some embodiments of the present disclosure permit the identification of order groupings despite the myriad of factual cases in which two or more customers may wish to dine together.

System and Method Components

In various embodiments, the present system and methods of use thereof include the following components.

Ordering System

The present disclosure comprises, in various embodiments, a production-timing and slip-logic mobile ordering and order management system. A particularly suitable such system, incorporated in many embodiments herein, is described in patent publication US 2017/0018041 A1, published Jan. 19, 2017, the disclosure of which is incorporated herein by reference for all purposes. Further details regarding the ordering system is provided, as relevant, herein, particularly in relation to the detailed description of the FIGs.

Mobile ordering system, as used herein, is defined as a system that provides customers with the ability to place an order via a mobile device. Mobile device, as used herein, encompasses stationary computers that are able to remotely access the system—such as a desktop personal computer connected to the internet. Some mobile devices herein must be literally mobile—such as carried in a hand, vehicle, about the human body, etc.—as indicated expressly or by context, such as for dynamically tracking customer location. Such mobile devices include smartphones, tablets, laptops and notebooks, smart watches, vehicle-integrated processing and connectivity systems, and other suitable devices.

Non-Sequential Order Pick Up Window

In preferred embodiments herein, a restaurant location comprises at least one non-sequential order pick up window (unless specified otherwise, also referred to herein as "order pick up window," or "pick up window," and sometimes abbreviated when repeatedly used simply as "window"). It should be noted that, as used herein, "order window" is defined as a general term that includes order pick up windows, order payment windows, order placement windows, or any order-related window, unless otherwise indicated explicitly or by context. An order pick-up window is a type of order window.

A non-sequential order pick up window is configured for customers to come to the window and pick up their order in the sequence that the order is ready, and not necessarily in the sequence that the order was placed. In preferred embodiments, the order pick up window is used to deliver orders to customers that have already both placed and paid for their order online (including through a mobile device). In preferred embodiments, the order pick up window does not have a microphone, and does not accept payment for orders. In particularly preferred embodiments, the restaurant location does not have any microphone for customers in the parking lot to communicate with the restaurant staff. In particularly preferred embodiments, there are no sequential queues in the parking lot.

"Non-sequential," as used herein, unless otherwise indicated, is defined as referring to lane, order pick up window, etc. that: (a) is not necessarily entered or approached in the sequence of order placement, or of customer arrival at the restaurant location but, instead, (b) is accessed in the sequence of order pick up, or at least of attempted order pick up by the customer, which is generally and preferably the sequence determined by the intersection of when the orders are ready and when the associated customers arrive. In other words, ideally, a non-sequential lane is entered and a non-sequential order pick up window is approached, for example, when: (a) the customer is present at the location, and (b) an order-ready board (or other order-ready notification system) indicates to the customer that their order is ready for pick up.

Non-sequential queuing spaces or lanes, and non-sequential parking spaces, however, are typically entered when a customer arrives, allowing the customer to wait conveniently for a notification that their order is ready. Such spaces and lanes are still non-sequential in the sense that they do not block other customers from entering the non-sequential drive-through lane or approaching the non-sequential order pick up window, thereby preserving efficient customer flow and reducing or eliminating unnecessary wait time because of sequential, linear queuing.

In some embodiments, no orders are taken at the order pick up window. In some embodiments, orders and payment are received at the order pick up window, but the customer must exit the lane accessing the order pick up window and wait to be notified (such as by the order board) that the order is prepared, before re-approaching the order pick up window. Such embodiments provide service to customers who do not have access to a mobile device, eliminate the need to go inside to place an order (whether for convenience of the customer or because the restaurant has no area inside for receiving orders), while preserving the efficiency of non-sequential access to the order pick up window.

In some embodiments, the restaurant location does not have any microphone for customers to communicate with wait staff. Customers place their orders in various embodiments, through a mobile device, through a web site, inside the store, at a kiosk, with an attendant in the parking lot, or—in relatively limited circumstances—at the order pick up window. Eliminating the microphone allows the restaurant to focus on accurate order preparation instead of trying to accurately hear and interpret customer orders, thereby eliminating a potential source of error. Eliminating the microphone encourages pre-ordering by customers, and the associated advantages discussed herein, including convenience and speed for other customers.

In some embodiments, order-placement stations are provided in the parking lot, inside the restaurant, at other convenient locations (such as a mall, grocery store, retail store, office building, industrial center, bus stop, food park, school, university, conference center, visitor center, travel center, convenience store, etc.). In some embodiments, the order-placement stations are kiosks, staff, or third-party personnel or equipment. In some embodiments, the order-placement stations also accept payment through at least one of: credit cards, debit cards, automated clearing house system, electronic funds transfer, cash, bitcoin, other electronic funds, or some combination thereof. In some embodiments, customers who approach an order-pick up window to place an order are directed to order online, with a mobile device, inside the restaurant, or at an order-placement station.

Order Notifications

In various embodiments, customers are provided with various order notifications through the ordering system, a notification system, an order-ready board (discussed hereafter), etc. In preferred embodiments, customers are provided with notifications on their mobile device, in their vehicle, through short message service (SMS), electronic mail (e-mail), etc. In particularly preferred embodiments, customers are provided with a mobile device notification, an SMS notification, or both, when at least one of the following occurs: their order is within a given time of being ready, or their order is ready. In some embodiments, customers receive a mobile device notification, an SMS notification, or both, when their order is ready.

Order-ready notifications are particularly important to non-sequential order pick up, as it prevents customers from entering the order pick up lane until the precise time their order is ready. This provides increased time convenience for customers, and minimizes the length of customer queues. As discussed elsewhere herein, minimizing the number of customers in a lane at a given time decreases customer wait time, and minimizes required real estate for a restaurant location.

Pre-Ordering and Pre-Arrival Production

In various embodiments herein, the ordering system allows, encourages, or requires, pre-ordering, or placing an order before entering the order pick up lane. In particularly preferred embodiments, the ordering system allows, encourages, or requires offsite (or at least outside of the pick-up lane(s)) placement of orders and payment for orders. Pre-ordering (typically also including pre-payment) allows the restaurant location to begin production before customer arrival, minimizing customer wait time and increasing restaurant and traffic efficiency.

In some embodiments, as discussed further elsewhere herein, a location providing only a non-sequential order pick up window, requiring (or at least highly encouraging) pre-ordering and pre-payment, reduces the amount of parking lot needed, as it can be treated like a pick up window (such as a laundromat) for planning and relevant city code purposes. For example, in one embodiment of a restaurant location serving a high-quality, highly-customizable casual restaurant menu, in a metropolitan area of approximately two hundred seventy-three thousand (273,000) people, anecdotal observation indicates that there are never more than two (2) or three (3) customers in a row at the order pick up window, even at highly busy times.

Furthermore, pre-ordering online, through a mobile device, etc. allows customers to more fully review the menu without time and embarrassment pressures, and to place the order without time and microphone and language or accent constraints. Accordingly, higher levels of customization and drastically reduced order mistakes are simultaneously possible.

Order-Ready Board (ORB)

Many embodiments comprise, or comprise the use of, an order-ready board (ORB) or similar order status display structure for notifying customers when to advance to a non-sequential pick up area. In various embodiments, the ORB is positioned such that it can be viewed when approaching a non-sequential drive-through pick up lane, from queuing parking spaces and/or lanes, and from at least some portions of the parking lot in general. The ORB presents at least the orders which can be picked up, using some form of identification which may be readily discerned by customers. In some embodiments, it alternatively or additionally presents the orders for which customers should approach the pic-up area(s) (preferably at least one window), even if the order is not actually ready yet.

Such an ORB is not a menu, such as display some or all of a restaurant's menu options, and from which customers determine what they are going to order. However, in some embodiments, a single structure combines both at least one each of an ORB and a menu. Conversely, in some embodiments, an ORB does not function as a menu in any capacity, and is not combined with any menu. Furthermore, in various embodiments, the ORB is not connected to a microphone, and so cannot broadcast a verbal announcement of an order number, a customer's name, etc.

In preferred embodiments, the ORB is provided in combination with a means for SMS messaging, mobile device notifications, e-mail, or another form of electronic messaging notification. In such embodiments, the customers may choose to rely primarily on looking at the ORB to know when to advance to the order pick up area(s), may rely primarily on the electronic messaging notification, or some combination thereof. In preferred embodiments, all pending orders are presented on the ORB, and customers are able to verify that their order is in process by looking at the ORB.

In some embodiments, the ORB is configured to protect identity, to combat theft of orders, or both. In some such embodiments, the ORB displays at least one of: an order identification alphanumeric string, a customer-provided 'nickname,' and a customer provided 'order identification' string. Such embodiments do not display a customer's actual name, phone number, or other sensitive information that may be used to breach the customer's security if publicly displayed. In some such embodiments, an additional piece of information, such as a confirmation string, a name, a phone number, or other information associated with the order and/or customer, and not made public on the board, is required before delivery of the order. Such embodiments prevent an order from being stolen by being seen on the ORB by a passerby and then being picked up.

An ORB may also be referred to as an order status display which, in various embodiments, displays orders that are ready, displays the status of all pending orders, or other suitable order status display configurations.

Group Ordering System

In various embodiments, customers are capable of joining a group order based on various input characteristics and contact information associated with the customer. In some embodiments, the customer may input specified codes—which can be for single-use or a recurring group order—that are associated with a group order on the group ordering system. In other embodiments, based on the characteristics, including but not limited to location, place of business, and related contacts, the group ordering system may alert the customer of a potential group order that would be convenient to the customer. In preferred embodiments, customers are able to select menu items and place an individual selection as part of the group order, which is then added to the running tab for the group. In some embodiments, customers in the group order receive a notifications leading up to a preset time when the group order will be closed and no additional modifications can be made. In certain embodiments, the customers in the group can receive a notification when the food is in preparation, when the group order has been picked up, and when the group order has been delivered to a convenient destination based on the characteristics of customers in the group order.

A group ordering system can be of particular importance when multiple individuals plan to order from a specific restaurant location and dine at the same time. The group ordering system can allow the individual customer orders to be placed up to a preset time and, so long as the customer in the group order makes menu selections prior to the preset time, all of the customers' orders in the group order can be treated as a single order when sent to and executed by the restaurant. The group ordering system is also beneficial to the restaurant preparing the order, as it reduces the amount of customers (or delivery drivers assigned to different customer orders) that will enter the pick-up lane, parking lot, and physical restaurant building to wait multiple different orders. Rather, for the group ordering system, a single delivery driver can be assigned to and handle the entire group order, as all of the food is set to be ready for pickup at the same time and will be delivered to the same location.

DETAILED DESCRIPTION OF THE DRAWINGS

FIG. 1—Ordering Process

Referring to FIG. 1, representing some exemplary embodiments, the process starts at 102 where customers access a menu of available items. The menu will generally be available on an interactive website or mobile application (app) that can be accessed by customer through his/her mobile device (cell phone, computer tablet, computer, and the like). Customers (guests) can place orders from anywhere—allowing them to plan ahead and pick up later. This allows other occupants in a vehicle to place the pick-up order while the vehicle is moving towards the restaurant. The menu display also includes means for the customer to indicate the desired pick up wait time ((for example: as soon as possible (ASAP), 10 minutes, tomorrow, etc.)).

FIGS. 2A-2D—Order System Screens

Figure 2A:
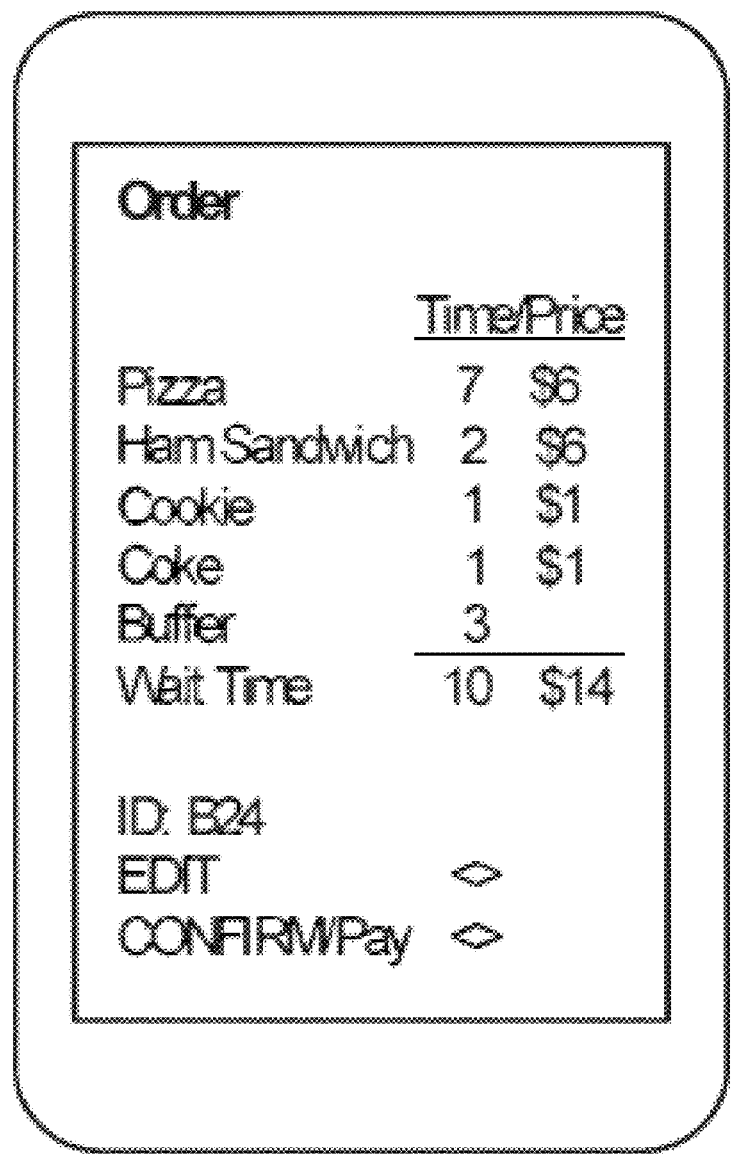
FIG. 2A is a schematic view of a possible mobile device display of an embodiment of the disclosure before editing an order.
Figure 2B:
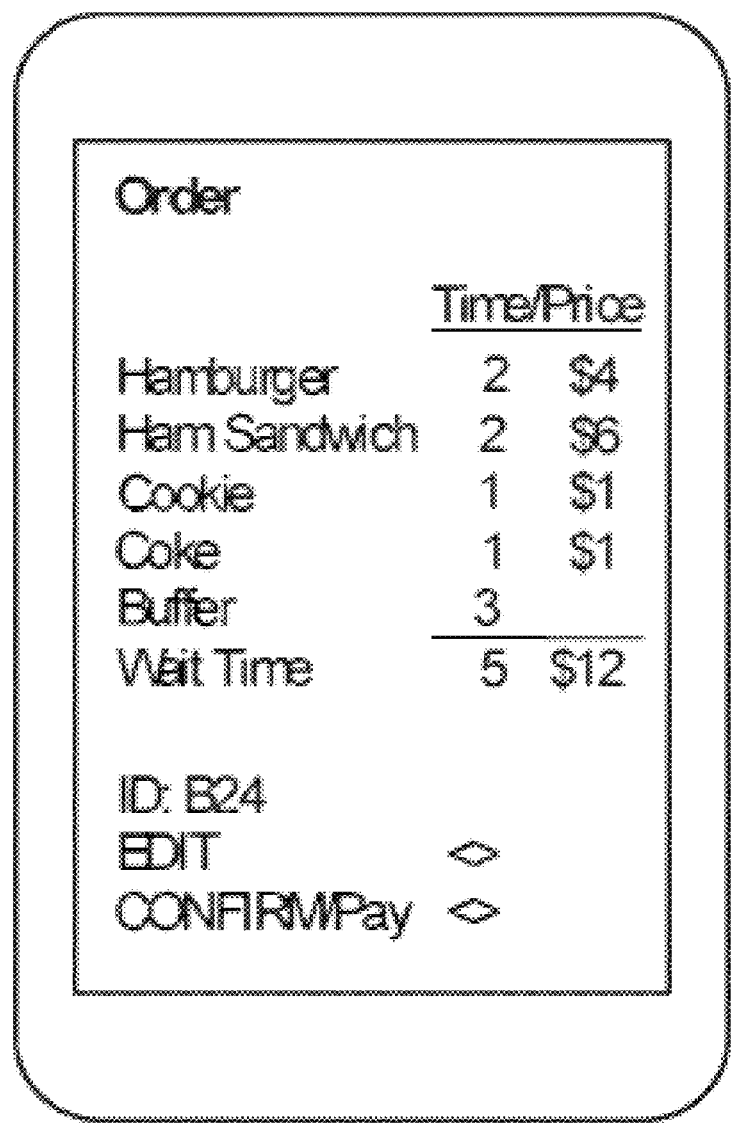
FIG. 2B is a schematic view of a possible mobile device display of an embodiment of the disclosure after editing an order.

In various embodiments, shown in FIGS. 2A-2D, when the customer accesses the menu a customer identification (ID) is generated by a data processing unit, or the customer uses an existing unique ID number or code. When the customer selects items from the menu for orders that are wanted ASAP, there is generated and displayed on the customer's mobile device or computer the menu items selected, the price and the preparation time for each item, and the preparation time plus indicated wait time, as illustrated in FIG. 2A and FIG. 2B. Thus, the customer can see (104 display on customer's mobile device, see also FIG. 2A-or appropriate computer screen) if the preparation for one or more items is excessive for his or her needs and can edit the order accordingly. The system data processor(s) will calculate all the variables.

If a particular item on the order could be deleted and allow the order to be produced more quickly, then the system will highlight that item and inform the customer how much time could be "saved" by not ordering that particular item. If no item can be deleted to save preparation time, then no indication will be displayed. The display may also display an appropriate message such as "Your Order's Wait Time will be X minutes. To shorten your Wait Time, remove the highlighted item(s) below."

The display may also show "Promised Time". For example, preparation time for pizza may be 7 minutes, and all other items (drinks, sandwiches, bagged chips, and the like) only 1-2 minutes, as illustrated in an example mobile device display in FIG. 2A. Thus, the customer may edit the order, for example, delete pizza, and select another item with shorter preparation time (see 106 to 102 of FIG. 1), such as is shown in FIG. 2B, where pizza is deleted and hamburger is selected.

Figure 2C:
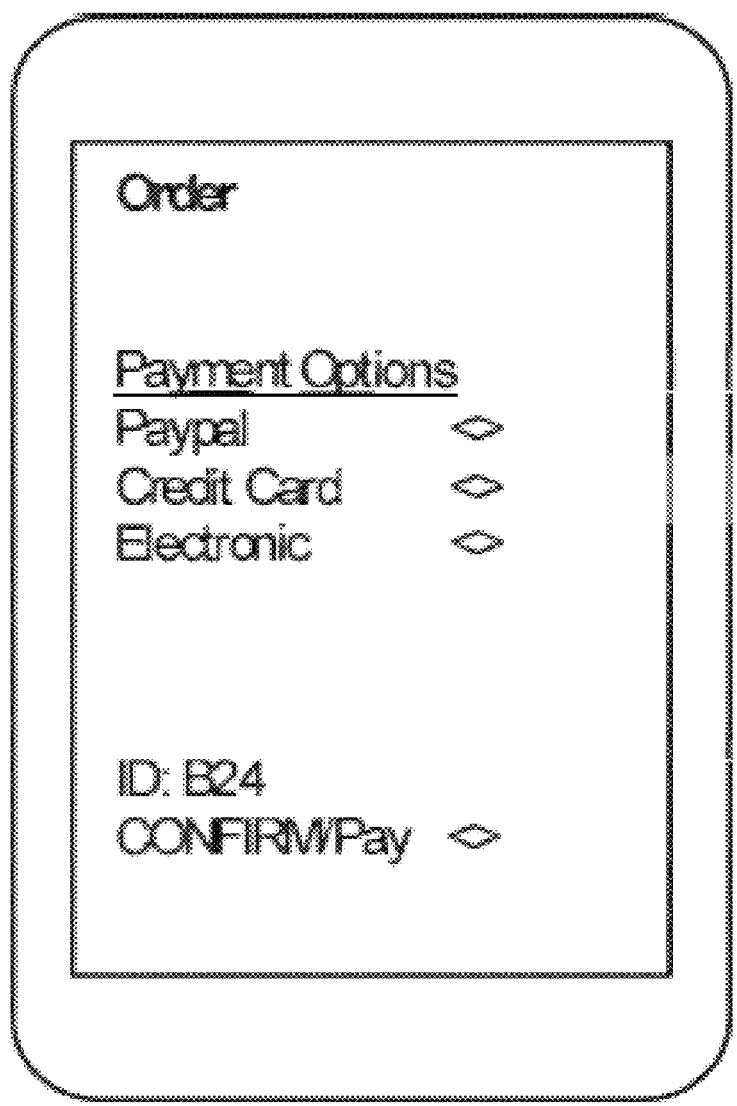
FIG. 2C is a schematic view of a possible mobile device display of an embodiment of the disclosure showing payment options.
Figure 2D:
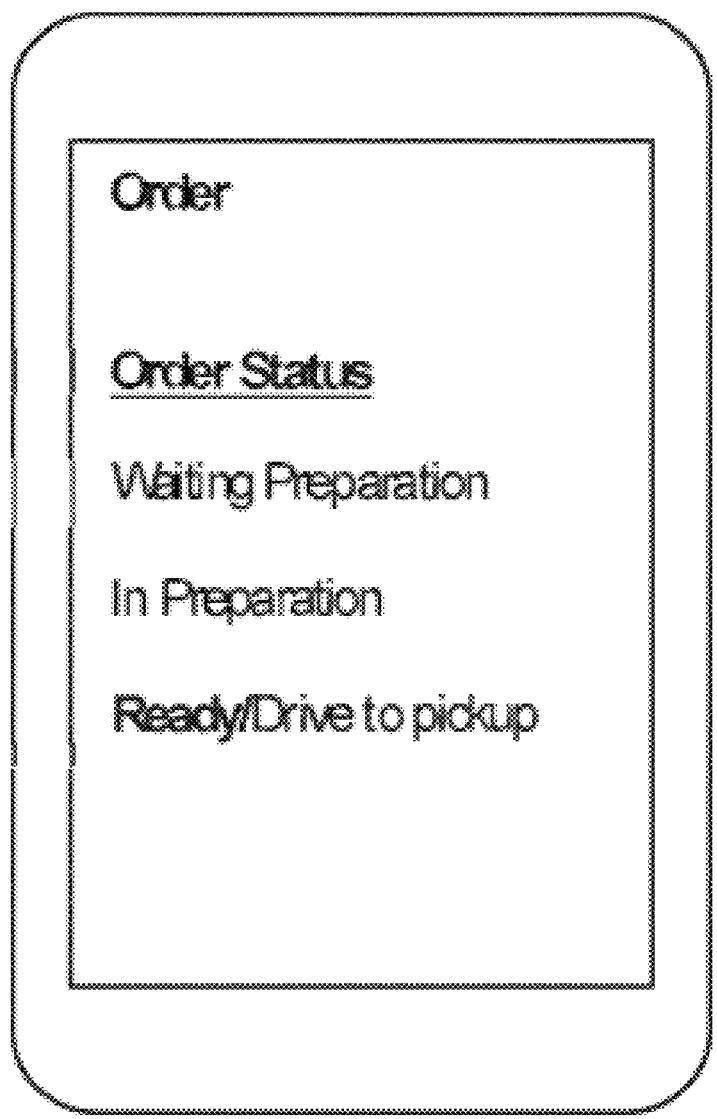
FIG. 2D is a schematic view of a possible mobile device display of an embodiment of the disclosure showing status of an order.

The order is confirmed or edited. If edited (as illustrated on FIG. 2B) it may then be confirmed. When confirmed, 106 (decision connector) to 108 (customer payment module), the order and cost is displayed (FIG. 2C) and the customer is asked to make required payment, as illustrated in FIG. 2C. The order status will be periodically or continuously updated (FIG. 2D). There will also be an indication on the customer's device screen that the "order is ready." For future planned orders where a customer selects a specific time slot and day, the system will determine whether or not the order can be produced (and delivered) by the time requested, and inform the customer on its device screen. No production times will be displayed.

When the customer selects items from the menu, there is generated and displayed on the Customer's mobile device or computer the menu items selected, the price and the indicated total wait time. Also displayed next to any one item in the order is the amount of wait time that could be removed from the total wait time by removing that one item (which has a longer production time associated with it) from the order. Thus, the customer can see (104 display on customer's mobile device, FIG. 2A) if the preparation for one or more items is excessive for his or her needs and can edit the order accordingly. For future "planned" orders the customer selects a specific time slot and day. The system will determine whether or not the order can be produced (and delivered on time) by the time requested. In this scenario, no production times will be displayed because they do not matter.

As noted above there is also provided means, in some embodiments, for customers to enter a unique customer ID number or code upon placing an order (for example, to create an account). This identification number or code will facilitate speedier service and allow identification of repeat and frequent customers. Customer's payment types, past orders and favorites are remembered by the system, thus, making reorder quicker and more convenient compared to traditional drive through windows.

The wait time for as soon as possible (ASAP) orders and time slots allowed for future orders is based on an algorithm that factors multiple variables. Variables include (but are not limited to):

a. ASAP or promised time(s) of prior orders and the current production progress of each of those prior orders
b. Order size
c. Order item complexity
d. Production staff levels
e. Delivery staff levels
f. Skill levels of staff members
g. Delivery distance of prior and current orders The system, with a customer identification, is programed in some embodiments to allow frequent, loyal, "very important person" (VIP) guests to jump ahead of the line and for their order to receive preferential timing. The system is also, in some embodiments, configured to allow guests to pay an extra fee to receive their order quicker. It also allows, in some embodiments, for a "Free if Late" promotion, other promotions, or some combination thereof. The system contains a management tool for measuring and tracking promised times versus actual fulfilled delivery and pick up times.

In preferred embodiments, only electronic payment from a customer's mobile or computer device connected by the internet (or other distributive computing method or connectivity method) is accepted as payment. There are many mobile payment systems available and more are being developed all the time. These include Square Wallet, virtual prepaid cards, Google Pay, Apple Wallet, Android Pay, Dwolla, and the like. In some embodiments, there is provided a kiosk at the restaurant location for payment by credit card, cash, other payment means, or combinations thereof. Also, in some embodiments, there is provided a customer service representative (order taker) in the location parking lot that will have a mobile device for taking orders and payments.

In addition to displaying the menu or ordered items there is provided, in some embodiments, an interactive sensor (usually a button) on the menu display on the customer's mobile device or computer that will allow nutritional information for the menu or ordered items to be displayed. The nutritional information also contains, in some such embodiments, various diet "points," such as used by diet services as, for example, Weight Watchers™, Jenny Craig™, NutriSystem™, and the like. The information is stored in data storage in the Data Processing Unit or other suitable accessible data storage, and is accessed by the appropriate computer program of the computer system.

Kitchen orders are prepared by the preparation staff in parallel, not necessarily in linear sequence, as determined and arranged by an algorithm of the data processing unit. The system algorithm determines which order to make next and dictates promised completion times. Simple orders and preferred guests' orders are moved forward in progression. Multiple orders are worked simultaneously. When orders are complete, the customer is notified and the order preparation algorithm is updated to calculate a new preparation display for the preparation kitchen staff.

When the order is ready the customer is notified (112) (FIG. 2D) by visual display (FIG. 2D) or text message on his/her mobile device or computer, or by any other suitable means, and the customer moves to an order pick up window, 120. An order placed for delivery also receives a text message on his/her mobile device or computer, or by any other suitable means, to notify them that a delivery driver has departed from the restaurant with their order and gives them an updated arrival time based on current traffic conditions available on various internet sites. Thus, there is no sequential waiting for order pick up: the order is picked up when ready and, since the order is prepaid, no wait is necessary for payment and change making. This is facilitated by the arrangement of the location physical layout explained in more detail below.

The data processing unit or module, 110, is the computing and data generation heart of the system. It contains suitable data storage capacity for menu items, prices, preparation time, customer identification, order details, payment details and the like. It is capable of computing preparation wait time and pre-preparation times from inputted and stored data and causing the resulting information to be displayed on customers' devices and display panels (116), for customers and preparation personnel.

The data processing unit and associated data storage will suitably be a computer programed and running software to perform the functions described. Implementation of such a data processing system is well within the capabilities of those skilled in the art.

Figure 3:
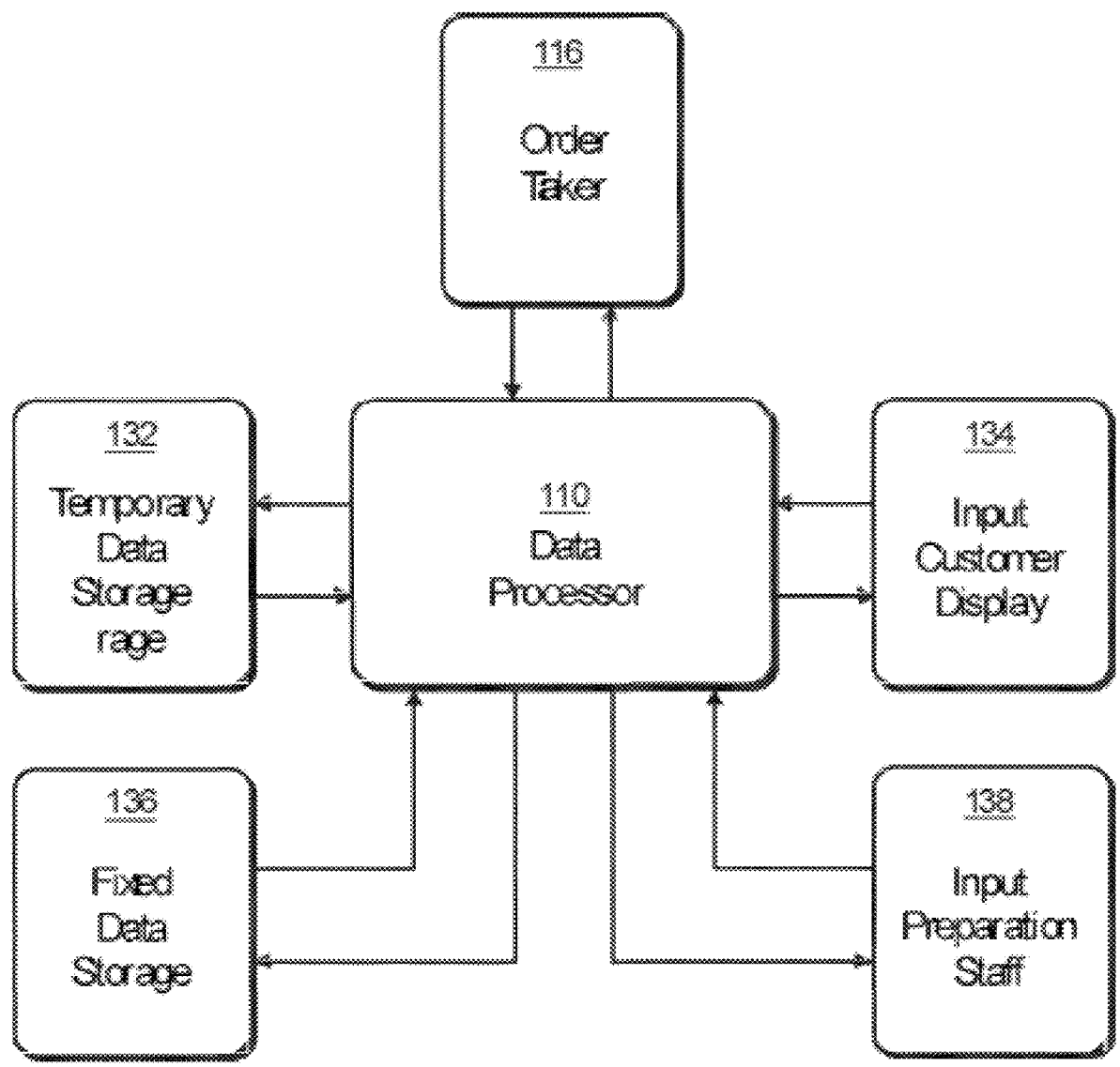
FIG. 3 is a flow diagram of the process showing data flow in a data processing unit.

FIG. 3—Ordering System

Referring to FIG. 3, representing various embodiments, there is a flow process diagram of functions of the data processing unit. FIG. 3, 110 is the computing data processing unit of the system. It will receive or access data from 136 fixed data storage and write to the data storage system. The data, such as menu items, prices, preparation time, and the like, are "fixed" in the sense that they are not immediately variable.

The system will have a mechanism allowing a manager to log in and mark any item, such as "Sold Out," so that customers cannot continue ordering an item no longer in stock. The data may be updated as often as needed and there are means for updating the data. This management or administrative unit allows for input, for changes in data storage, and for receiving data output (see FIG. 5). Temporary, calculated, and intermediate calculation values are stored in data storage unit 132, and can be accessed and written to by the data processing unit, 110. For example, the preparation time is affected by staff levels and skill levels in the algorithm.

Customer input is from 134 and includes ordered item, edits, delay or requested wait time, and the like. Order taker(s) (116) provides input/output. These staff members may be located at a call center, or in a restaurant, and will take orders by phone from customers and enter into the system. They may be assigned to roam the parking lot of a restaurant location and take orders from customers in cars. Input from the preparation staff is shown as 138, and includes start time, order ready information and may include continuous update of order status.

There is also provided means for the Preparation Staff and order administration/management to input data on orders that are being processed. These will include, in some embodiments, individual computer tablets, or equivalent or larger display panels, that will have data on customer ID, ordered item, requested delay time, and calculated preparation order sequence. In some embodiments it is not expedient for the preparation staff to use touch or keyboard inputs, but foot operated input devices are suitable. Voice control input to suitable receivers are preferable in some embodiments. There an abundance and variety of voice activated/control technology available which can easily be adapted for use in the system of the disclosure.

The data processor unit will calculate the needed information and send it to the appropriate location. In general, communication for the data processing unit to customer's display and preparation staff will be wireless. The data processing unit and data storage may be a dedicated system or operated by remote shared distributive computing ("the cloud"). A cloud system will generally be preferred.

FIG. 4—Parking Lot

Figure 4:
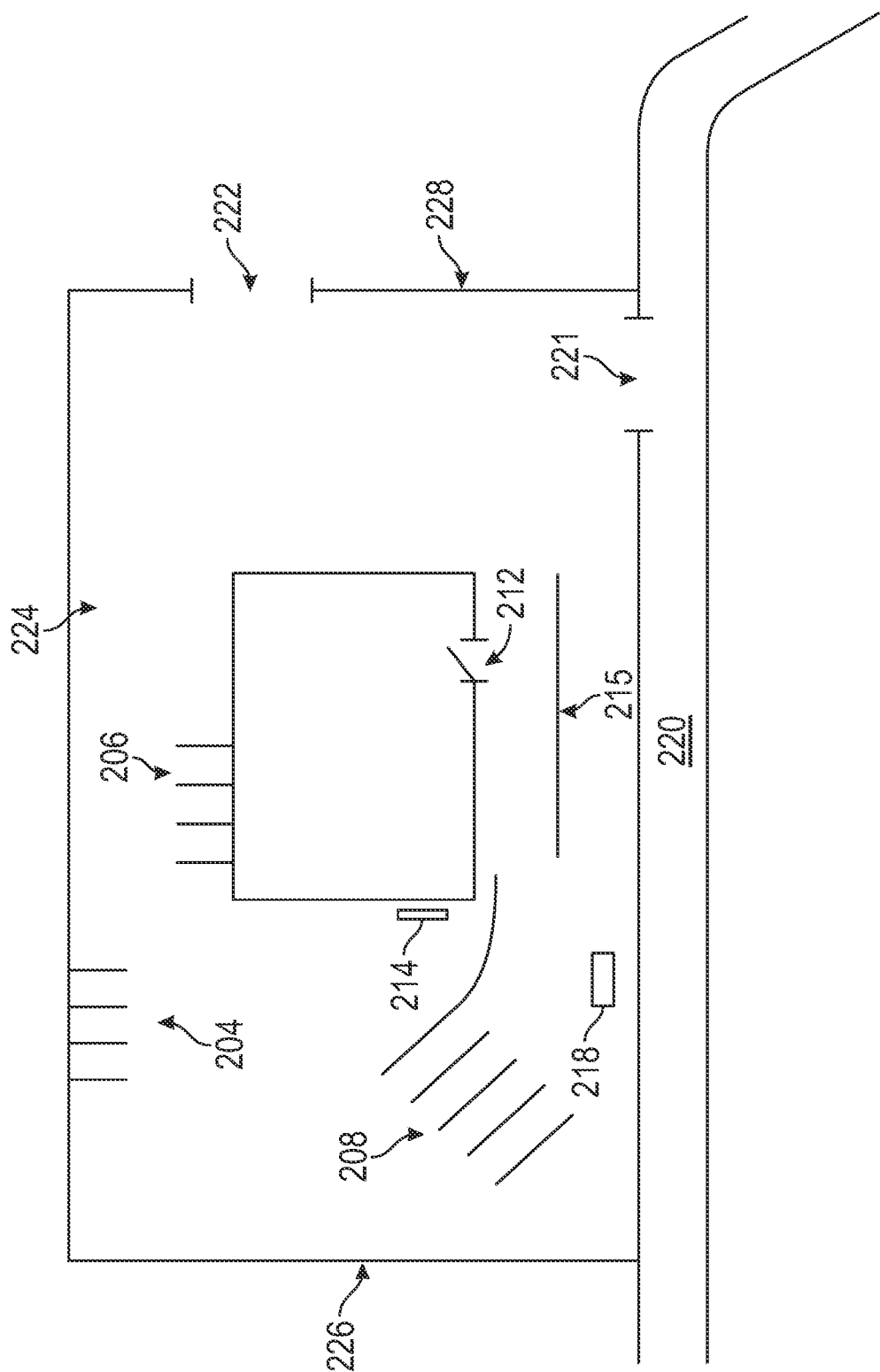
FIG. 4 is a schematic representation of a restaurant building and parking layout for an embodiment of the disclosure.

Referring to FIG. 4, which is an illustrative restaurant/lot arrangement of an embodiment of the disclosure, 202 is a restaurant building, 212 is an order pick up window, 204 and 206 are customary parking spaces, and 208 is a plurality of non-sequential parallel single vehicle parking spaces for cars placing orders and awaiting order ready notification. An access road 220 has lot entrances 221 and 222. The side by side non-sequential single vehicle parking spaces, with access to a non-sequential drive through lane 215 leading to the non-sequential pick-up window 212, allows customers to: a) not feel rushed when placing an order because no car is behind their vehicle waiting to order; and b) proceed to the pick-up window immediately when their order is indicated as ready without the potential wait that can be caused in a traditional drive-through by other customer's queued vehicles in front of them awaiting their orders' production and completion. This can greatly reduce waiting time and improve the ordering experience. Having payment prior to pick up also reduces wait time and makes the entire process more efficient. Items 224, 226 and 228 are lot perimeters. Item 214 is an ORB, used in some embodiments and not in others, for displaying customers order ready information. Item 218 is a payment kiosk provided only in some embodiments.

Customers (guests) may enter the lot and park in the customary parking spaces, or in the non-sequential single vehicle slanted spaces, as they desire. Menus are displayed on customer's mobile devices, or computers through the internet or other suitable distributive computing/communication system, and orders are made and processed when customers are at any location. In preferred embodiments, orders are entered before the guest enters the parking lot, scheduled for times in the future, etc. Customers wanting immediate, "as soon as possible" (ASAP), service will generally be located in the parking lot, be prepared to depart their current location for the restaurant, or be headed towards the restaurant lot. The most expedient location will be the slanted non-sequence single vehicle spaces 208. Customer without the ability to pay by mobile device may, in some embodiments, drive by the optional kiosk 218 and pay with cash or credit card or, in some embodiments, may pay via an optional attendant that roams the parking lot to take orders and payment. There is no provision for payment at the order pick up window.

Figure 5:
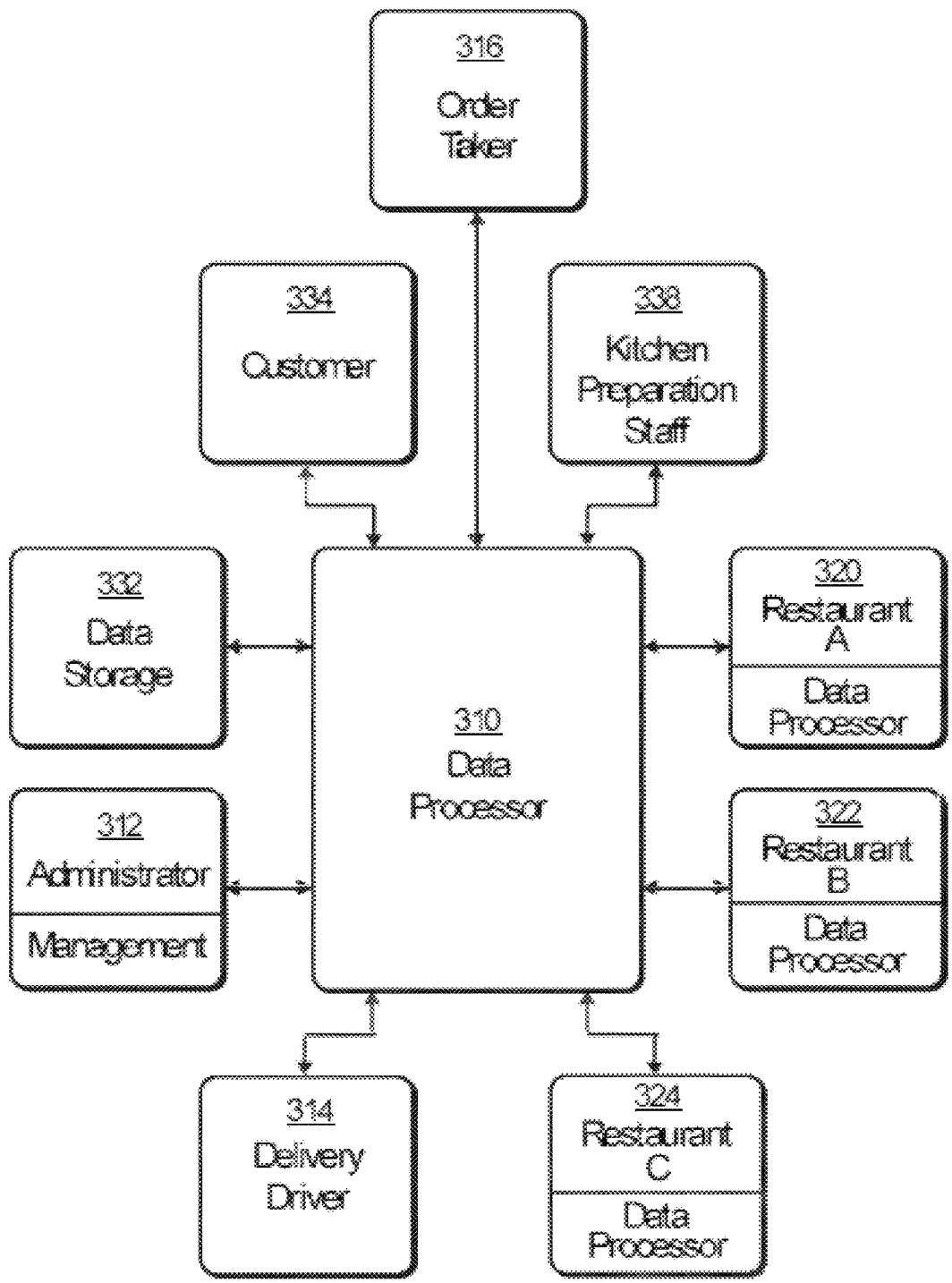
FIG. 5 is a flow diagram of the process of an embodiment of the disclosure.

FIG. 5—Multi-Location System

The system, in various embodiments, interconnects more than one restaurant (store) unit into a combined system and connects to the data processing unit with a complete feedback loop to and from each restaurant to provide information of all orders to each location. An embodiment of such a system is illustrated in the flow diagram of FIG. 5. This information is updated when every order in progress is noted as complete.

This multi-location system allows routing of order preparation to the most efficient location, where possible. It is especially helpful for scheduling and preparing pre-scheduled and delivery orders. Each restaurant unit, 320, 322 and 324, will have its own server (data processor) that will be able to communicate with the central data processor 310. The order data starts off on the server (data processor) hosting the website, ordering system, or application, and is then passed to the appropriate store server. One unique feature is that the system data processors are then passing data back and forth at least to the system website or applications to update the "overall order queue" timing of current orders.

Each restaurant unit, 320, 322 and 324, has the ability to adjust certain timing variables based on current in-unit conditions to increase or decrease wait times displayed to guests currently ordering. The system will access in-unit schedules and staff positions and skill levels to determine team's productive capacity at any given time interval on any given day. The management display and input unit, 312 is connected to the data processing unit, 310, to allow administrative input and to be able to obtain real time and calculated information of the operations. Inputs include, pricing, staff level at each location, order status, particularly prescheduled and delivery orders, etc. The system also allows for delivery drivers, 314, to be re-routed from one store pick up location to another store pick up location by a central logistics control mechanism factoring in variables to shorten the overall wait time for customers, 334.

Manager(s) can login and update the system to current staff levels and in store conditions so that adjustments to timing are made; for example, sick staff members, delivery driver in vehicle accident, etc. The system will also allow managers, 312, to manually increase or decrease wait timing to slow or speed up order inflow. The system will supply data from future guest orders (for tomorrow, two days out, etc.) to kitchen/bakery production software and vendor inventory ordering software to help better prepare product quantities for future work dates. FIG. 5 illustrates the system having multiple stores interconnected. The data processing unit 310 and data storage units 332 are central (on-site or cloud). The data processing unit receives inputs and provides data and output to each of the interconnected restaurants A (320), B (322) and C (324). It can receive and provide data (directions etc.) to a delivery driver (or drone) and provide order information to Kitchen preparation staff, 338, and to the Administration unit 312.

Order taker(s) are also an optional input/output source, 316. These staff members may be located at a call center or in a restaurant, and will take orders via phone, chat, etc. from customers, 334, and enter the orders into the system. They will also roam the parking lot and take orders from customers in cars. This will allow orders by those customers who do not wish to use their own mobile devices. It will also allow better customization of future orders, as the order takers will be able to gather and input to the system identification data such as the customer's name, phone number, credit card number, automobile license plate number and the like to make the ordering process more convenient for guests.

For example, the customer's vehicle license plate number is saved to the guest's user profile so that staff members will know the guest's name, have stored payment information tied to the account, see the guest's favorites, past orders, etc. as they approach the guest's car. This should make the ordering experience more convenient for the guest. With payment types stored to the user profile, on return visits in the same car, guests will not need to physically provide their credit card. In some embodiments, the restaurant location is provided with at least one license plate reader, camera, or similar technology, to allow restaurant staff, the ordering system, or both to identify the customer or customer's vehicle before the customer arrives at the order pick up window.

In some embodiments the disclosure is a system and process for managing and scheduling an order in a restaurant with both pick up business and delivery business. Scheduling take-out orders and delivery orders in the same preparation location (kitchen) is made more efficient while reducing wait time on pick up orders. This management process works basically the same as for pick up orders, except that driver pick up, driver time availability, and various orders' delivery locations proximity to each other will be taken into account in the data process unit to determine the scheduling of preparation and calculate delivery time. This allows proximate orders to be clustered with one driver to speed up overall times. Driver location and arrival time will be displayed on the delivery customer's computer or device in the same manner as for pick up customers.

Figure 6:
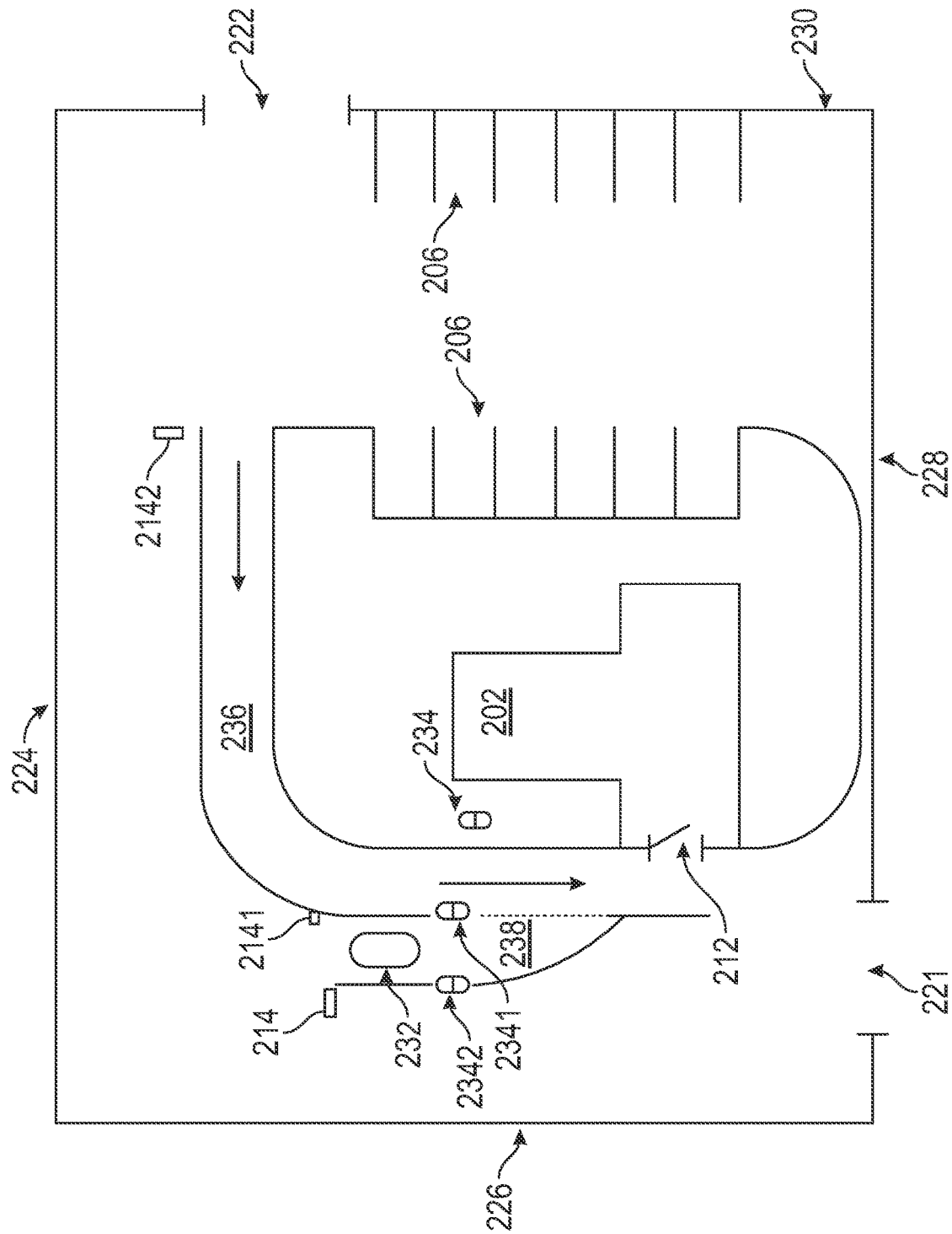
FIG. 6 is a schematic representation of a restaurant building and parking layout for an embodiment of the disclosure.

FIG. 6—Another Parking Lot

Referring to FIG. 6, which is an illustrative restaurant/lot arrangement of an embodiment of the disclosure, 202 is a restaurant building, 212 is an order pick up window, and 206 is customary parking spaces. The restaurant is, in some embodiments, a traditional restaurant with a sequential drive-through order lane 236, such as at a menu board with a microphone (not shown), with an additional non-sequential drive-through pick up-only lane 238 accessing a single order pick up window 212. In some embodiments, payments are accepted at window 212. In other embodiments, payment is not accepted at window 212.

Customers enter by lot entrance 222 and leave by lot exit 221. In some embodiments, side by side, non-sequential, single vehicle parking spaces (not shown), with access to the non-sequential drive through lane 238 leading to the pick-up window 212. Items 224, 226, 228, and 230 are lot perimeters. Item 214 is an ORB for displaying customers' order ready information. Item 2141 is an ORB that is narrower, and vertically-oriented, used alternatively or additionally in some embodiments. Item 2142 is an alternate ORB location used additionally or alternatively in some embodiments.

Pre-order customers (guests) may enter the lot and park in the customary parking spaces, or the non-sequential single vehicle slanted spaces (not shown), if provided, as they desire. Menus are displayed on customer's mobile devices, computers through the internet, or other suitable distributive computing/communication system. Pre-orders are made and processed when customers are at any location. In preferred embodiments, pre-orders are entered before the guest enters the parking lot, scheduled for times in the future, etc. Customers wanting immediate, ASAP, service when pre-ordering will generally be located in the parking lot, be prepared to depart their current location for the restaurant, or be headed towards the restaurant lot.

Customers who wish to drive through and have not pre-ordered, and do not wish to place mobile or online orders, are referred to herein as order-in-line customers. Such customers will enter sequential drive-through lane 236, and will typically place their order at a microphone-equipped menu board (not shown), previous to stop-go light 234, 2341, or 2342. Stop-go light 234 indicates to order-in-line customers whether they may proceed in the drive-through lane 236 to the order pick up window 212. Stop-go light 2341 is alternatively or additionally used in some embodiments.

Pre-order customers will enter non-sequential drive-through lane 238, preferably when their order is ready, as seen on at least one ORB (214, 2141, 2142, or some combination thereof). Customer presence detector 232 detects when a vehicle is present in lane 238, and staff inside restaurant location 202 are notified. In some embodiments, stop-go light 2342, stop-go light 2341, or both, indicate to non-sequential pre-order customers whether to merge in to lane 236 and approach the order pick up window 212. In some embodiments, wait staff are also provided with customer identification, as discussed elsewhere herein—such as a license plate reader, notification from the customer's mobile device, etc.—in order to have the appropriate order already located and waiting at the window.

Pre-order customers without the ability to pay by mobile device may, in some embodiments, pay at the order pick up window, similar to sequential order-in-line customers.

Figure 7:
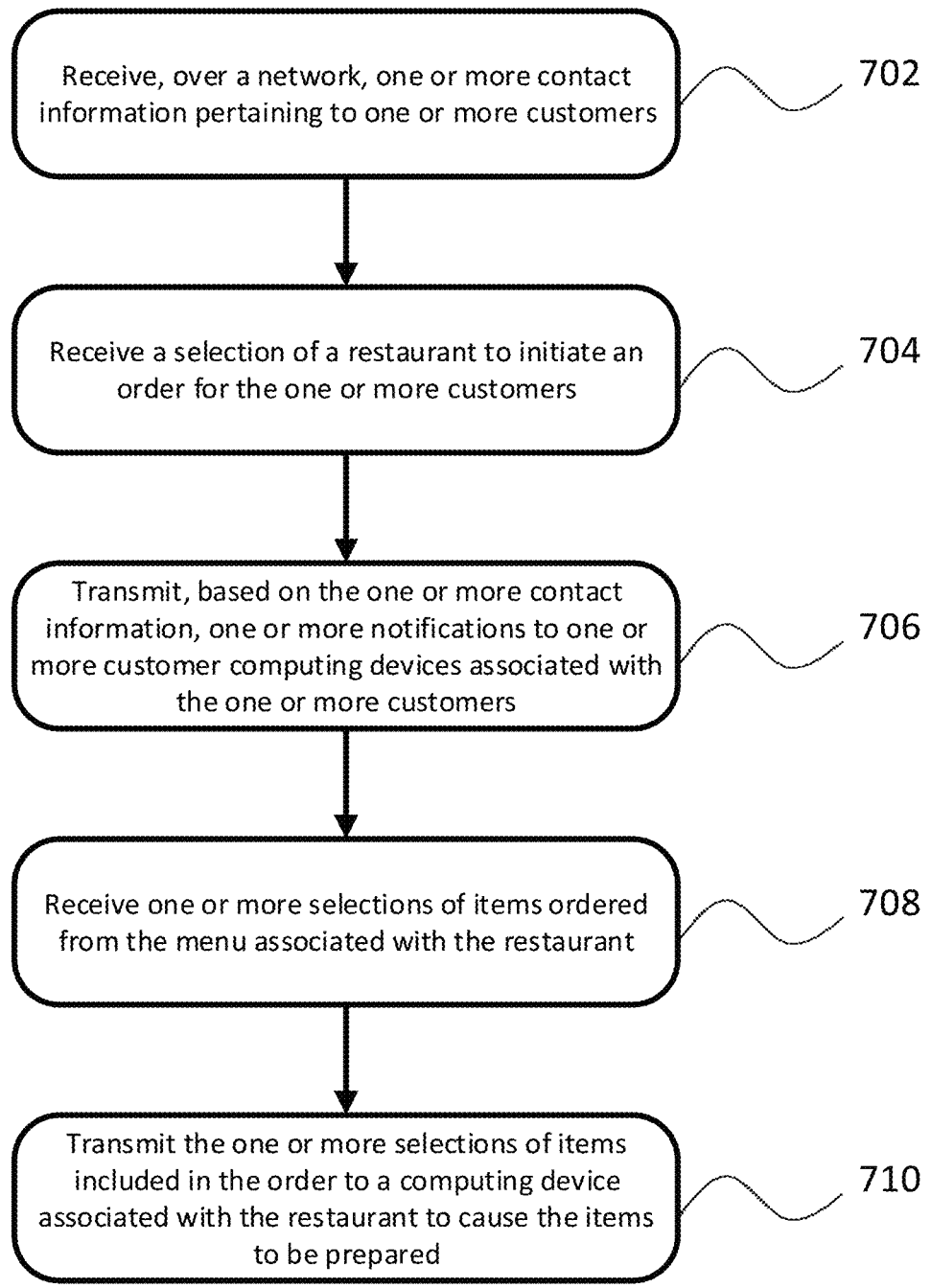
FIG. 7 is a method displaying a process in accordance with certain embodiments of the present disclosure.

FIG. 7—Coordinated Ordering Method

Referring to FIG. 7, which shows a method 700 coordinating ordering between mobile devices. The method 700 may be implemented as computer instructions stored on one or more memory devices and executed by one or more processing devices. As shown in FIG. 7, method 700 beings at step 702. At step 702, one or more pieces of contact information is received over a network. The one or more pieces of contact information pertain to one or more customers. In some embodiments, the one or more pieces of contact information may be stored using a mobile application on the customer's mobile device. In some exemplary embodiments, the one or more customers are associated with each other based on characteristics noted in the one or more pieces of contact information. For example, in some embodiments, the one or more customers can be members of family. In such an example, the one or more customers may share the same home address, home phone number, or combinations thereof. Additionally, in some embodiments, the contact information received at step 702 may show that the customers are associated with one or more entities. For example, the one or more pieces of contact information pertaining to the one or more customers may correspond to ordering from a particular physical location, be associated with a particular company, or combinations thereof.

At step 704, a selection of a restaurant to initiate an order for the one or more customers is received from at least one customer. At step 706, one or more notifications to one or more customer computing devices associated with the one or more customers are transmitted. In some embodiments, the transmission can be based on the one or more pieces of contact information. Following, at step 708, the system receives one or more selections of items ordered from the menu associated with the restaurant. For example, in some embodiments, the one or more selections of items can be ordered in parallel by the one or more computing devices associated with the one or more customers.

At step 710, the method 700 continues through transmitting the one or more selections of items included in the order to a computing device associated with the restaurant. Responsive to the receipt of the one or more selections, in such an embodiment, the restaurant may begin preparing the items included in the order. For method 700, the method may additionally include dynamically repeating at least one of steps 702 through 710 responsive to an update of the provisional input from any one of the one or more customers. Such an update of the provisional input may include a change to the selections of items, an update to the payment credentials, or the addition of a selection from another customer associated with the one or more pieces of contact information.

In some embodiments, the method 700 may additionally include a step of receiving a cutoff time for when the order must be placed. In such an embodiment, after receiving a cutoff time, the method 700 may continue with disabling an ability to modify the order after the cutoff time. Additionally, in another embodiment, method 700 may include receiving a selection relating to designating the order as a pickup order or a delivery order. For example, if the order is designated as a delivery order, the one or more pieces of contact information may be utilized to determine the delivery location of the order.

In certain embodiments, the method 700 may additionally include a step of determining a property of the one or more customers. The property of the one or more customers, in some example embodiments, may be determined based on contact information common between the one or more customers. In other embodiments, the determination of the property of the one or more customers may be specified from the provision of additional contact information at the time the order is placed. From this, the method 700 may also continue with limiting one or more items associated with the menu based on the property of the one or more customers.

In certain embodiments, the method 700 may additionally include a step of receiving a time selection for the items to be prepared. For example, the one or more customers can select a designated pickup time from the restaurant to retrieve the entirety of the selections made by the one or more customers. In response to the time selection, in some embodiments, method 700 may additionally include a step of transmitting the time selection to the computing device associated with the restaurant to cause the items to be prepared at the time.

For certain embodiments pertaining to delivery, the method 700 may also include a step of transmitting, by the computing device, a location to which the restaurant is going to deliver the items. The transmission, in such an embodiment, may be made to a website, application, customer mobile device, or combinations thereof. Further, in this embodiment, the method 700 can simultaneously transmit a timeframe at which the restaurant plans to make the delivery. Accordingly, in the example embodiment, the method 700 may include receiving, from the one or more customer computing devices, one or more confirmation messages indicating the one or more customers will be at the location and the timeframe to pick up the items.

Figure 8A:
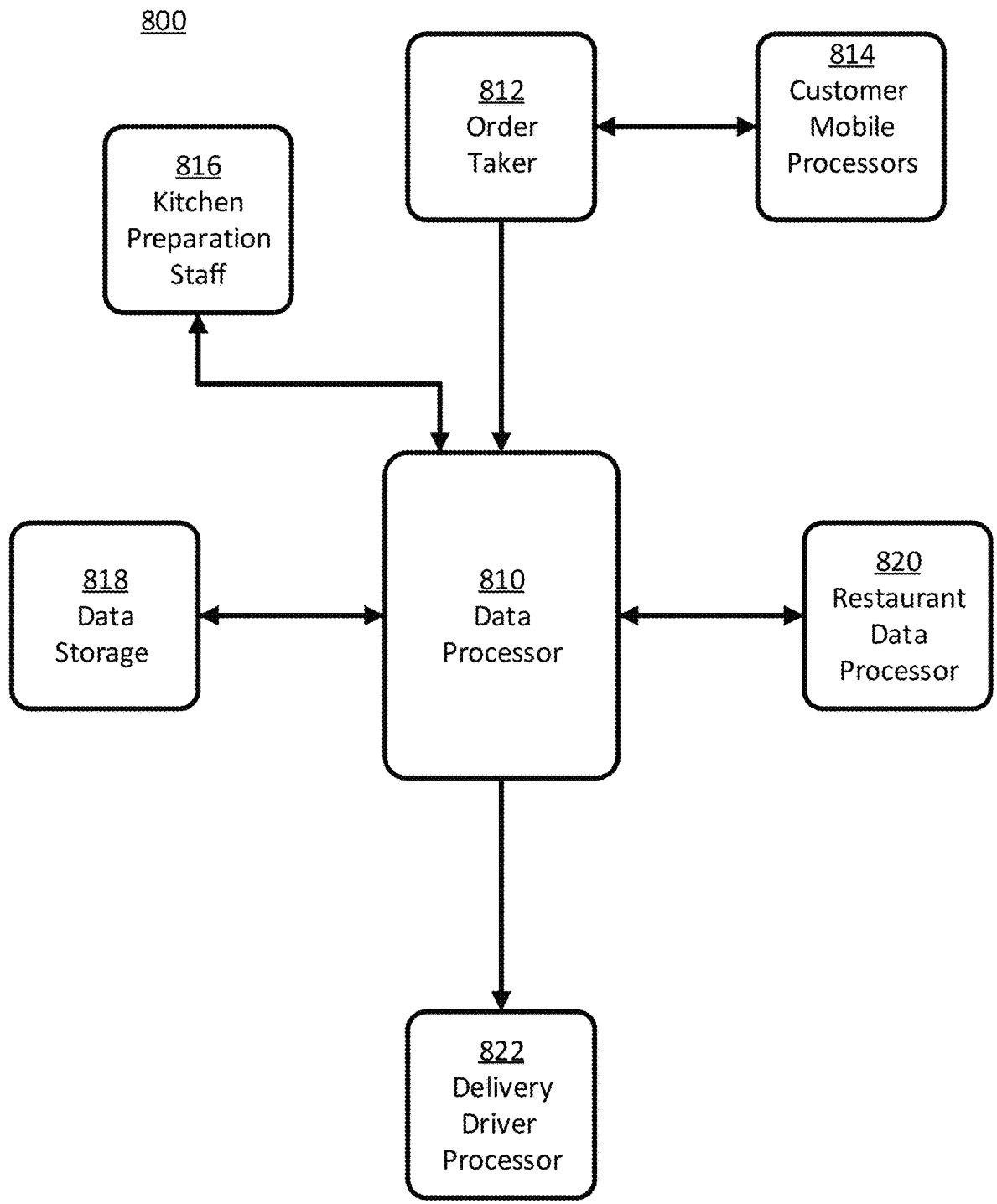
FIG. 8A is a flow diagram of the process showing data flow in a data processing unit in accordance with certain embodiments of the present disclosure.
Figure 8B:
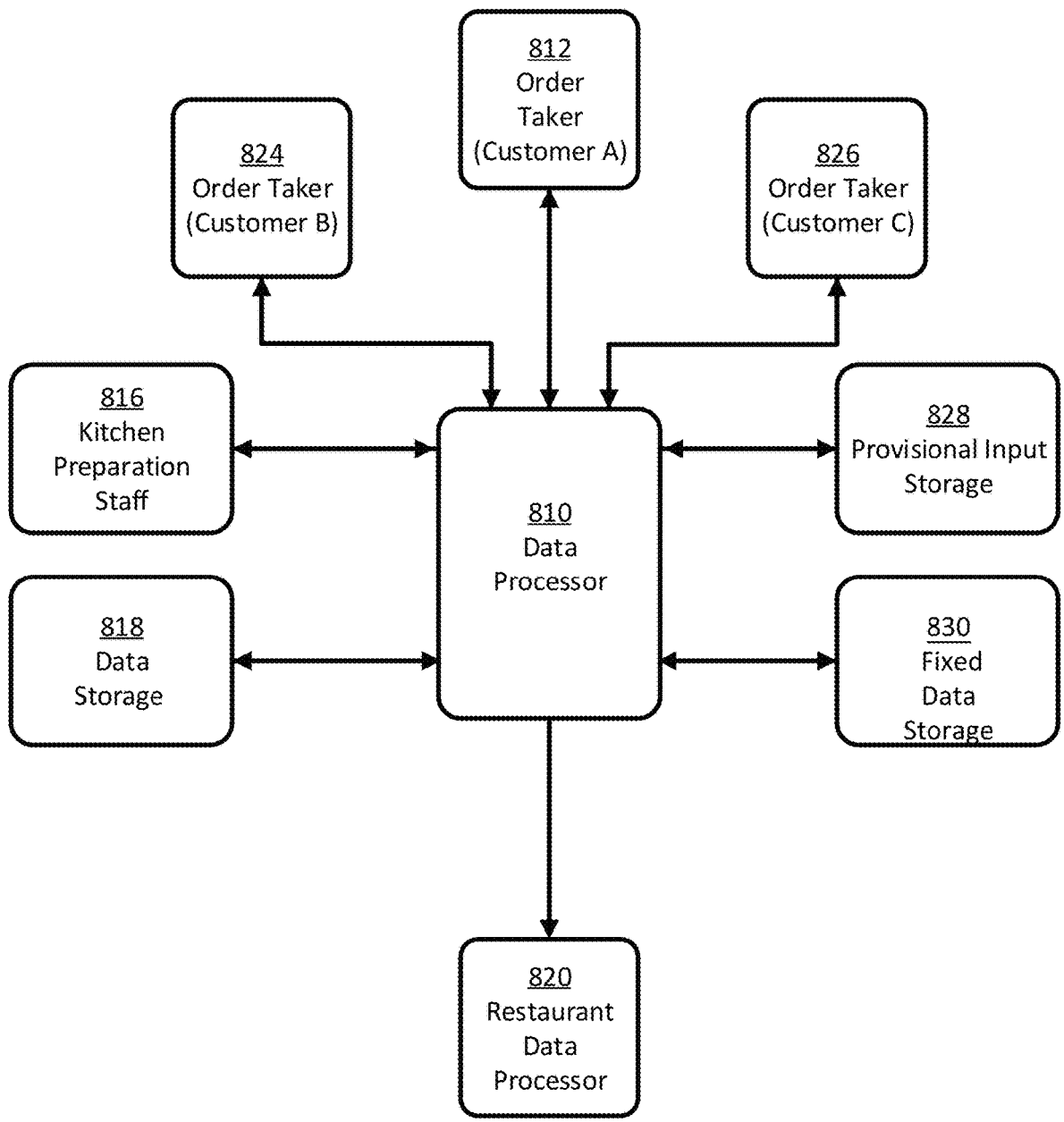
FIG. 8B is a flow diagram of the process showing data flow in a data processing unit in accordance with certain embodiments of the present disclosure.

FIG. 8A-B—Coordinated Ordering Systems

Referring to FIGS. 8A and 8B, representing various embodiments, there is a flow process diagram of functions of the data processing unit. In FIG. 8A, the system, in various embodiments, interconnects more than one restaurant (store) unit into a combined system and connects to the data processing unit with a complete feedback loop to and from each restaurant to provide information of all orders to each location.

This multi-location system allows routing of order preparation to the most efficient location, where possible. It is especially helpful for coordinating pickup and delivery orders associated with multiple customers, which may order from separate computing devices.

In the embodiment of FIG. 8A, one or more customer mobile processors 814 can be communicatively coupled to an order taker 812. The information from the order taker can be accessed through interaction with the data processor 810. Further, in such an embodiment, the data processor 810 may receive or access data from data storage 818 and write to the data storage system. The data, such as menu items, prices, preparation time.

In addition to the stored data, the information, inputs, and real-time conditions may be provided by the kitchen preparation staff 816 and information stored in the restaurant data processor 820. For example, the input from kitchen preparation staff 816 can include start time, order ready information and may include continuous update of order status.

Accordingly, in some embodiments, based on the information received from the order taker 812 in communication with the customers mobile processors 814 and considering the input from the data storage 818, kitchen preparation staff 816, and restaurant data processor 820, the data processor 810 may communicate optimal pick up information to an assigned delivery driver using a delivery driver processor 822.

Further, as shown in FIG. 8B, each customer unit may contain its own unit (data processor) that will be able to take an order, such as order taker 812, 824, and 826, and then communicate with the central data processor 810. The order data starts off on the server (data processor) hosting the website, ordering system, or application, and is then passed to the appropriate store server. One unique feature is that the system data processors are then passing data back and forth at least to the system website or applications to update the "overall order queue" timing of current orders.

Immediate changes to customer input—prior to the retention in the provisional storage 828—may come from order takers 812, 824, 826. The change information coming from order takers 812, 824, and 826 can include changes to ordered item, edits, delay or requested times for arrival at the dine-in restaurant location, and the like.

In some embodiments, the inputs from the kitchen preparation staff 816, data storage 818 (based on information from provisional input storage 828 and fixed data storage 830), and restaurant data processor 820 work in conjunction with data processor unit 810 for storage of data and rules to help optimize the order completion time being determined by the data processor 810 in the system for coordinated item preparation.

The data processor unit will calculate the needed information and send it to the appropriate location. In general, communication for the data processing unit to customer's display and preparation staff will be wireless. The data processing unit and data storage may be a dedicated system or operated by remote shared distributive computing ("the cloud"). A cloud system will generally be preferred.

Figure 9:
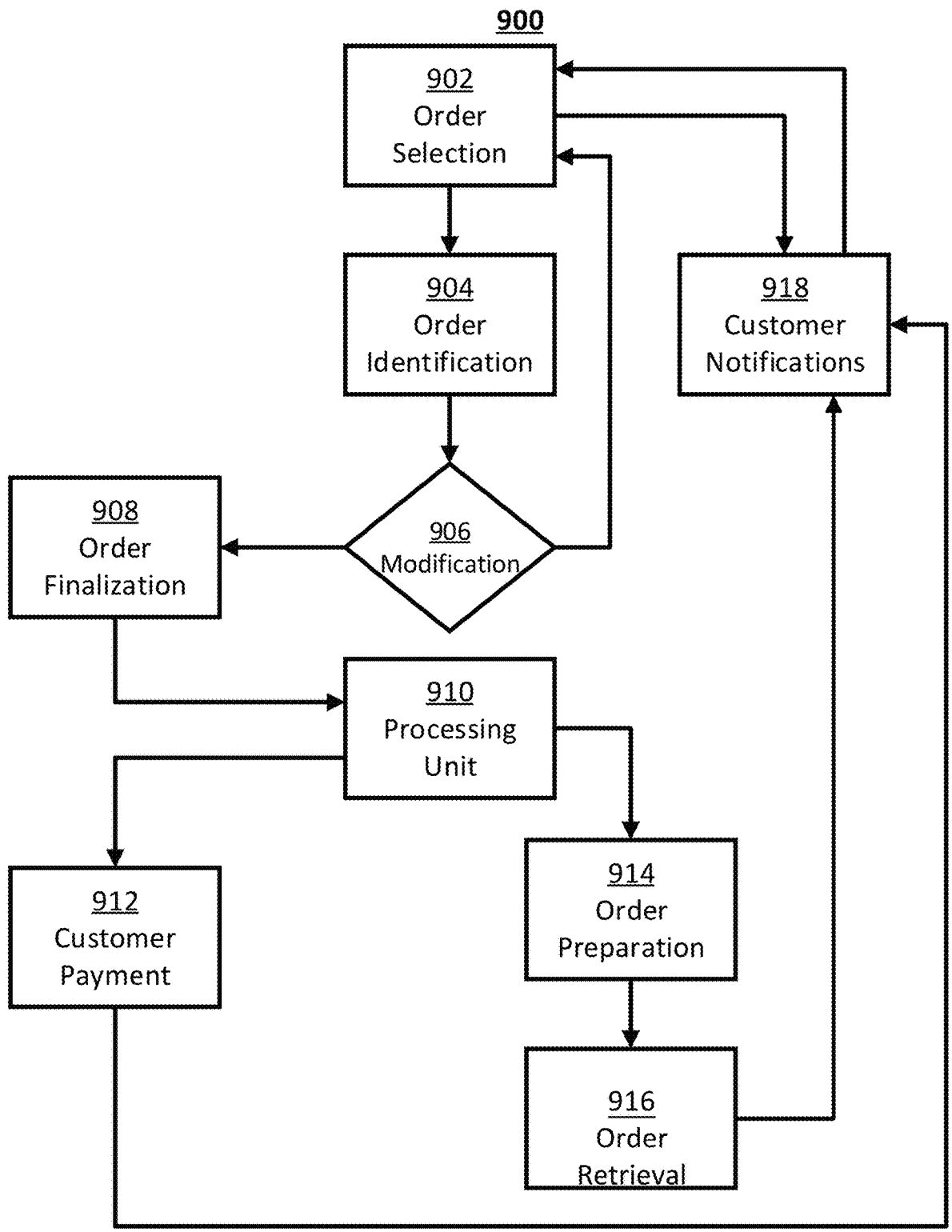
FIG. 9 is a flow diagram of the process of an embodiment of the present disclosure in accordance with certain embodiments of the present disclosure.

FIG. 9—Coordinated Ordering Process

Referring to FIG. 9, representing some exemplary embodiments, depicts a flow diagram of a process starting at block 902 where customers access a menu of available items and select an order based on available options on the menu.

In some embodiments, the menu can be available on an interactive website or mobile application (app) that can be accessed by customer through his/her mobile device (cell phone, computer tablet, computer, and the like). Multiple customers, in the embodiment depicted in FIG. 9, can place orders from anywhere, even separate from the other members of the group that the customers plan to dine with, and nonetheless still pickup (or receive delivery) at the same time as the rest of the group.

As shown in FIG. 9, the process continues from order selection to the identification of the order at block 904. For example, in some embodiments, prior to and during the placement of the order, the customer may select or confirm one or more pieces of customer information that relate to the customer making the order selection. Based upon the one or more pieces of customer information, at block 904, the order is identified as belonging to a particular group associated with the customer. In some embodiments, as shown in FIG. 9, once the order is selected in block 902 and identified block 904, the customer will have the ability to modify the order at block 906. The steps between blocks 902 and 906 can repeat through multiple iterations of order selection.

Based on the order selection and determination of the group that the customer is ordering from, the process can involve sending a customer notification 918. For example, the customer notification at block 918 may notify members of the group that an order has been initiated, identified, modified, or combinations thereof. Responsive to receiving a notification at block 918, a new customer sharing one or more pieces of contact information with the original customer may begin the process starting at 902. In some embodiments, the notification arises when customers have input a particular code associated with an anticipated group order.

At block 908, the order can be finalized. In some embodiments, there can be pre-set or pre-determined time at which the order is finalized. In other embodiments, the customer can select when to finalize the order in block 908. Once the order is finalized at block 908, the information may proceed to a processing unit 910. Following from block 910, on the customer facing side, the customer can in some embodiments be prompted to select and/or provide payment information in block 912. Following from block 910, on the restaurant facing side of the process depicted in FIG. 9, the restaurant can begin order preparation in block 914.

After the order is prepared in block 914, the order may be set for retrieval in block 916. In certain embodiments, the retrieval can encompass a delivery driving picking up the order to bring to a pre-selected location and a pre-determined time. In other embodiments, the order retrieval at block 916 can occur from a customer—such as the customer making the order selection in block 902—picking up the food directly from the restaurant. In some embodiments, the delivery is determined and optimized based on geolocation of the user devices involved in the group order. Further, in some embodiments, the customer managing the group order can provide details to delivery drive about arrival time, location, preferences, and combinations thereof.

In some embodiments, and as shown in FIG. 9, the customer payment in block 912 and the order retrieval at block 916 may initiate a customer notification in block 916. In some embodiments, the customer notification pertaining to payment, pickup, and order selections can be distributed to each of the customers in the group associated with the order being placed through the process.

Figure 10A:
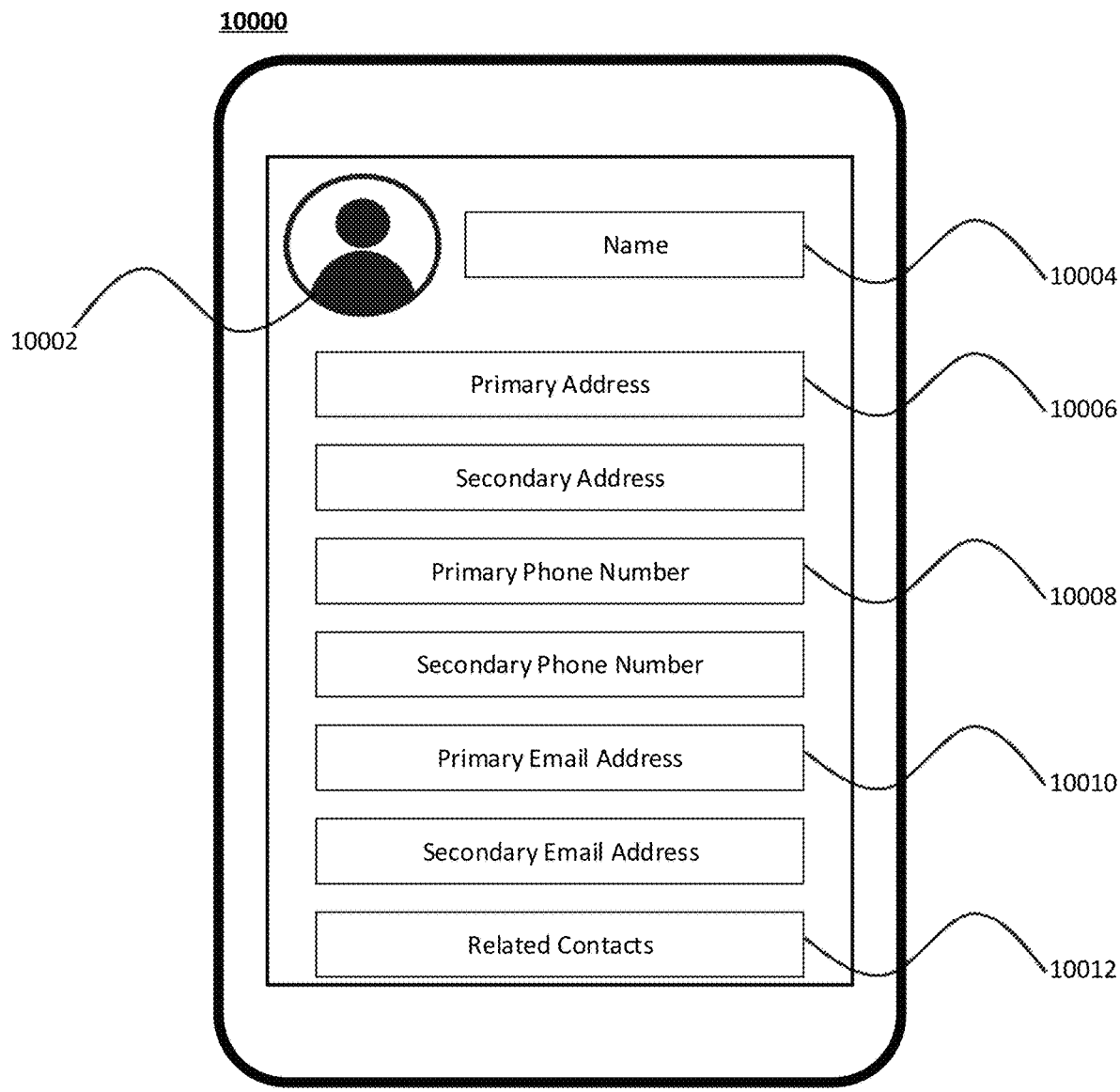
FIG. 10A is a schematic view of a possible mobile device display of an embodiment of the present disclosure showing a user interface for inputting contact information.
Figure 10B:
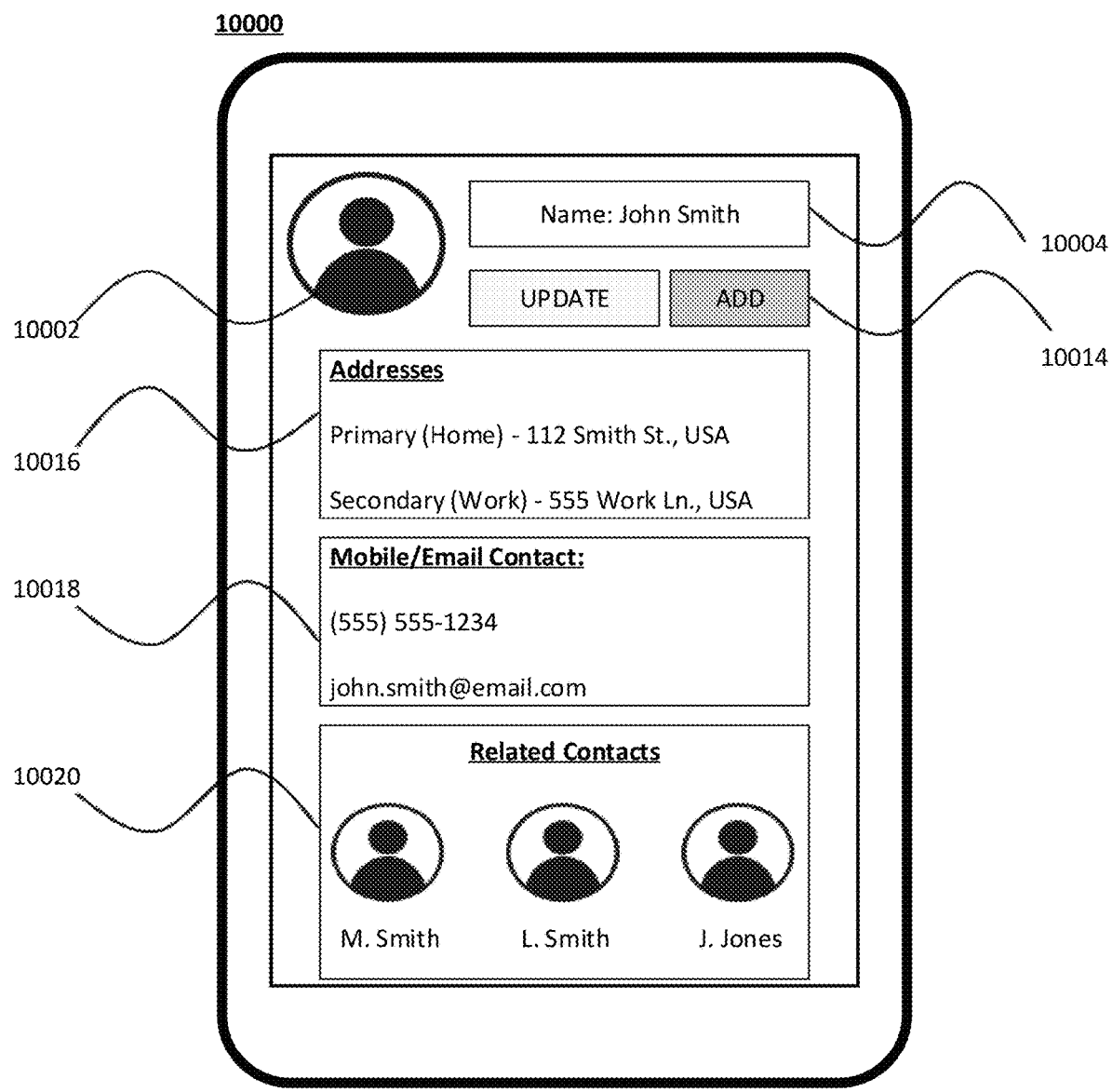
FIG. 10B is a schematic view of a possible mobile device display of an embodiment of the present disclosure showing a customer profile containing customer contact information.
Figure 10C:
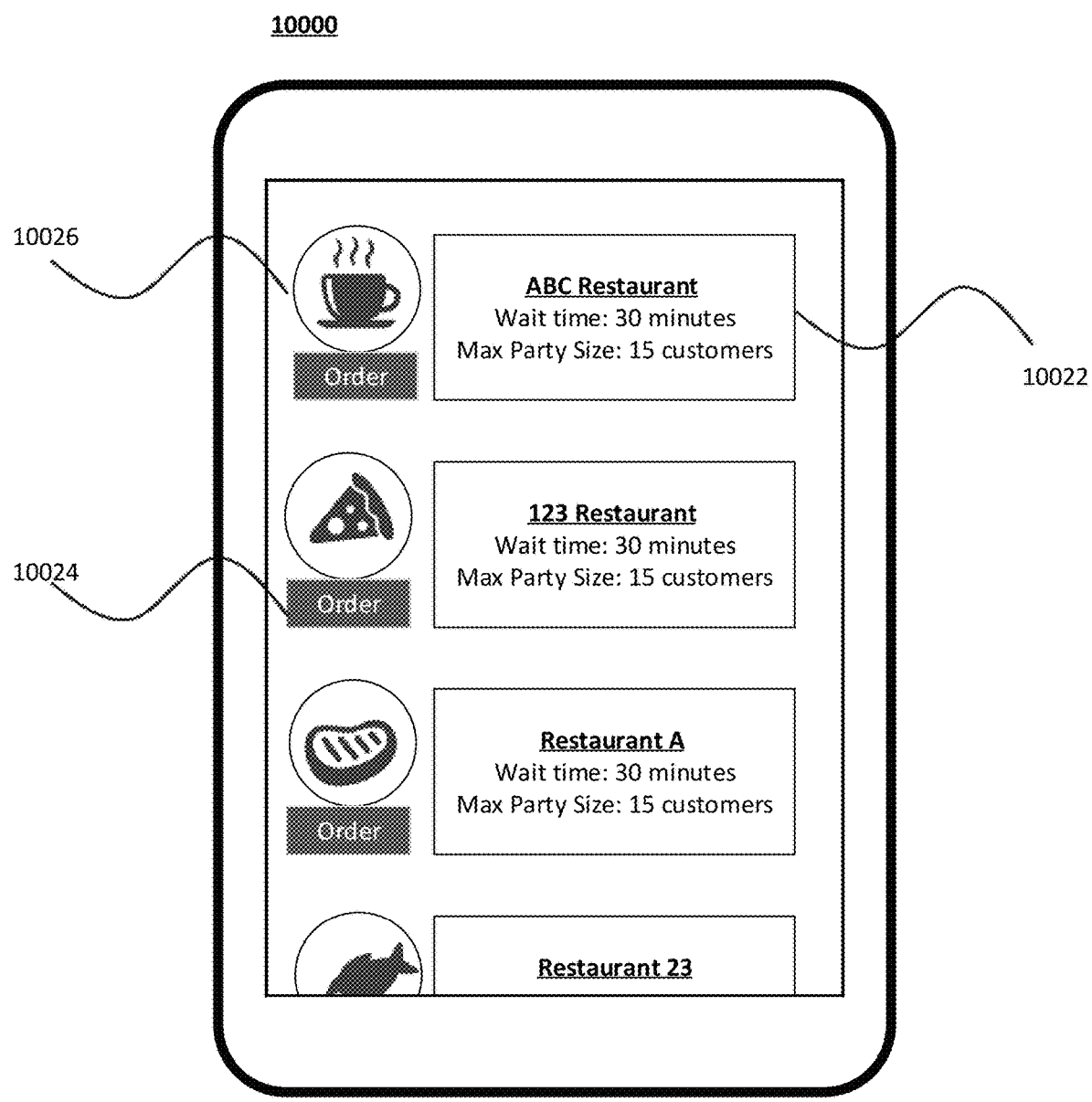
FIG. 10C is a schematic view of a possible mobile device display of an embodiment of the present disclosure before selecting a restaurant.

FIG. 10A-C—Contact Information Mobile Display Screen

FIGS. 10A-C depict a schematic view of a possible mobile device display of an embodiment of the present disclosure relating to contact information of customers using an application to order menu items from a coordinated menu system. In some embodiments, the displays shown in FIGS. 10A-C can be shown on a user device 10000, which can be a mobile device, a personal computer, a tablet, a desktop computer, or combinations thereof.

FIG. 10A shows an example screen on the user device 10000 for inputting one or more pieces of contact information. In some embodiments, the customer may select a picture identifier 10002 for use in regard to the profile that the contact information is associated with. In some embodiments, the user can input his or her name 10004, addresses 10006, phone numbers 10008, and email addresses 10010. In some embodiments, the customer can identify related contacts 10012 with whom the customer anticipates making a group order. The addresses 10006 provided by the customer can correspond to home address, work address, common business addresses, or combinations thereof.

FIG. 10B depicts an exemplary customer's profile on the user device 10000 after inputting the information requested on FIG. 10A. The example profile, in some embodiments, can show the picture identifier 10002 and name 10004.

In some embodiments, the customer can have the option to update, change, correct, or add new information relating to pieces of contact information by selecting an editing button 10014.

Additionally, in some embodiments, the information can be displayed along with the saved address information 10016 and saved personal contacting information 10018. Further, in some embodiments and as shown in FIG. 10B, the related contact profiles 10020 can listed on the customer's profile. In some embodiments, the customer can select the related contact profiles 10020 and link the profiles together under shared entities (such as work, family, or interest groups) or events.

FIG. 10C depicts a schematic view that a customer may see on a user device 10000 before selecting a restaurant for a group order. In some embodiments, the screen for selecting a restaurant may include restaurant identifiers 10026, as well as real-time information about the restaurant 10022. The real-time information about the restaurant 10022 may include, as shown in FIG. 10C, the wait time and the maximum party size for dine-in customers. Additionally, in some embodiments, the real-time information about the restaurant 10022 can include customer reviews, delivery/pick-up options, details about special pricing or menu features, or combinations thereof. In some embodiments, the screen will include an order button 10024 that the customer can select to initiate a group order at the particular restaurant corresponding with the order button 10024.

Figure 11A:
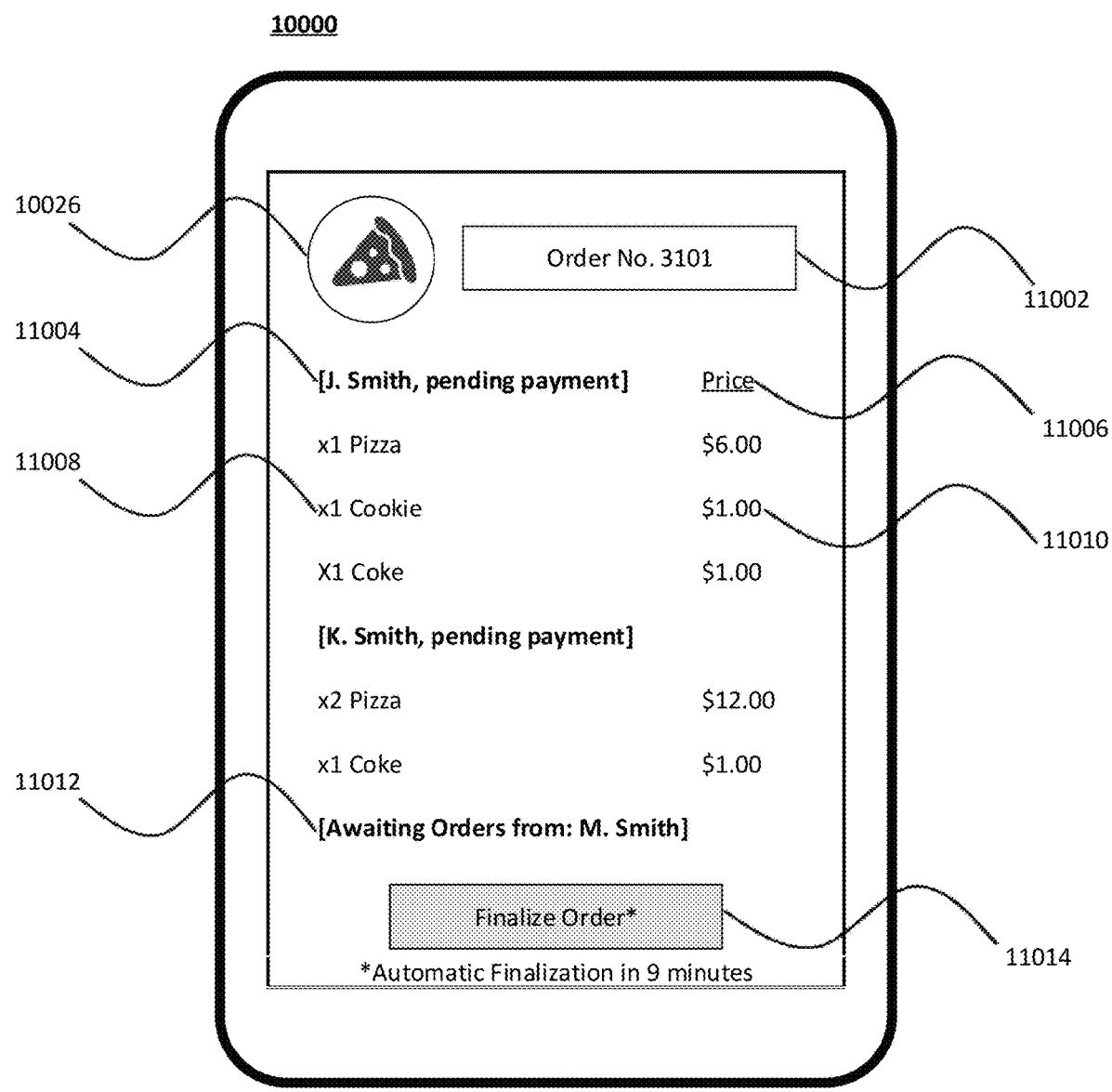
FIG. 11A is a schematic view of a possible mobile device display of an embodiment of the present disclosure before placing an order.
Figure 11B:
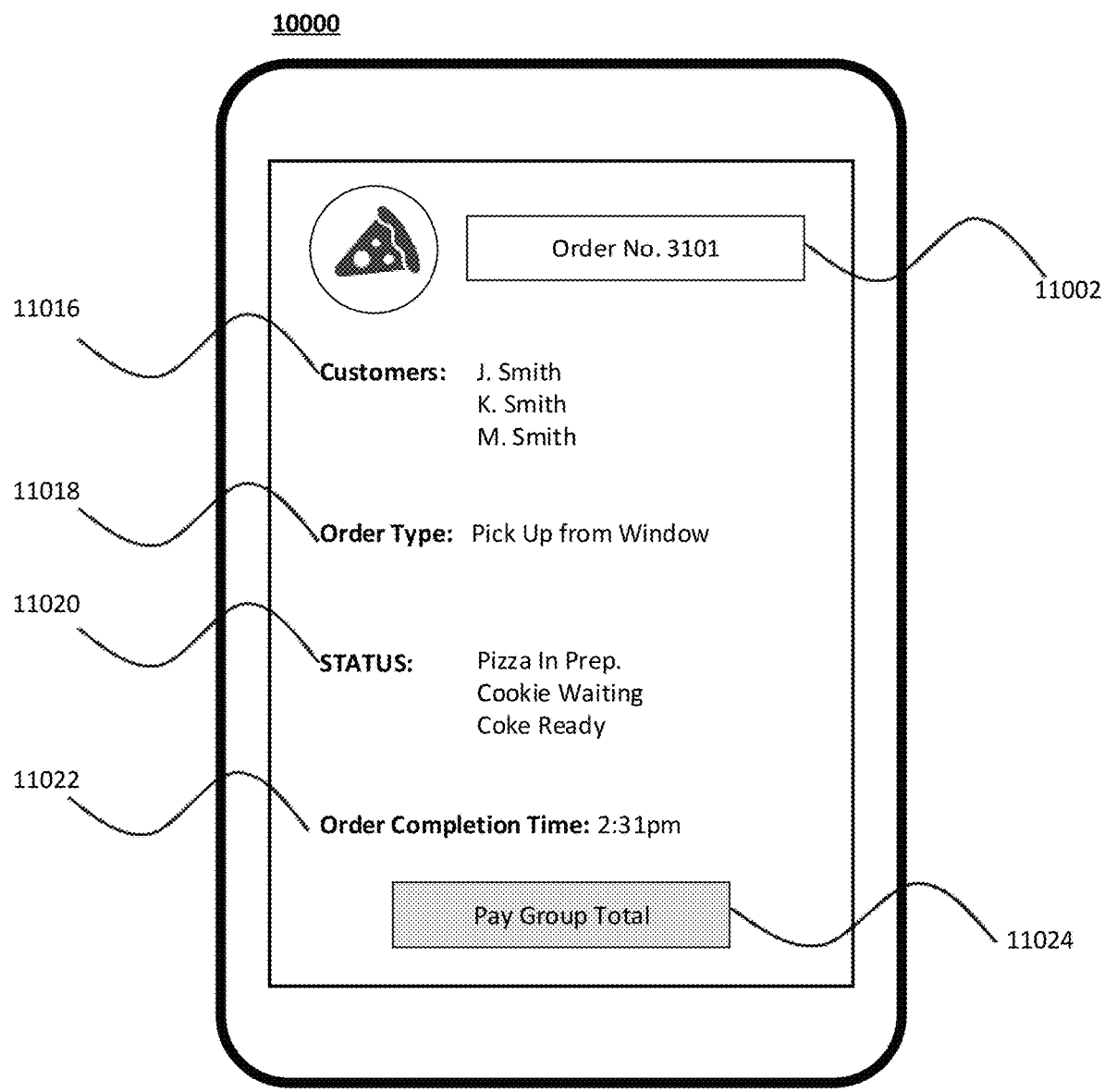
FIG. 11B is a schematic view of a possible mobile device display of an embodiment of the present disclosure after placing an order.

FIG. 11A-B—Ordering Mobile Display Screen

FIGS. 11A and 11B depict a schematic view of a possible mobile device display of an embodiment of the present disclosure before placing an order (shown in FIG. 11A) and after placing an order (shown in FIG. 11B). In some embodiments, the displays shown in FIGS. 11A and 1B can be shown on a user device, which can be a mobile device, a personal computer, a tablet, a desktop computer, or combinations thereof.

FIG. 11A shows an example view that a customer ordering in a coordinated ordering system may view after selecting a restaurant and making preliminary ordering determinations. In some embodiments, a restaurant identifier 10026 may be present on the screen to confirm for the group that the order is being selected at one particular restaurant location.

In various embodiments, shown in FIGS. 11A-B, when the customer accesses the menu a customer identification (ID), through the form of an order number 11002, is generated by a data processing unit (e.g., processing device), or the customer uses an existing unique ID number or code. When the customer selects items from the menu for group ordering purposes, there is generated and displayed on the customer's mobile device or computer the menu items selected, the price for each item, and the option to set a drive to the dine-in restaurant, as illustrated in FIG. 2A. Thus, the customer can see (104 display on customer's mobile device, see also FIG. 11A or appropriate computer screen) which menu items to expect when arriving at the dine-in location and can edit the order accordingly. The system data processor(s) will calculate all the variables.

Thus, the customer may edit the order, for example, delete pizza, and select another item with shorter preparation time (see 106 to 102 of FIG. 1, which may be used in conjunction with the screen of FIG. 8A).

In some embodiments, after making menu selections, the customer may see the summary of their particular order along with the associated information for the rest of the group order. For example, as shown in FIG. 11A, the display may include a customer identifier 11004. In some embodiments, the customer identifier 11004 can include one or more contact information pertaining to the customer. For example, the customer identifier 11004 can include the phone number, email, or relation to the rest of the group pertaining the specified customer. Moreover, in some embodiments, the customer identifier 11004 may include information regarding whether the customer has already paid for the selected menu items.

In addition to the customer information, the screen may also show the price for the items selected for order under a specified price heading 11006. For each customer order under the customer identifier 11004, the selected menu items 11008 can be displayed along with the associated selected menu item prices 11010.

Moreover, in some embodiments, when there are multiple customers involved in the group order, the display can providing a pending order status 11012 to highlight which members of the group still need to place an order. In some embodiments, the pending order status 11012 can identify which members of the group still need to place an order.

In certain embodiments, the customers that are a part of the group order may have an option to select a finalize order button 11014. In certain embodiments, the finalize order button 11014 may only be available to select members of the group order. For example, in the situation where a company is organizing a group order for multiple employees (and the company is financing the order), the company representative may select to be sole customer in the group that can finalize the order to ensure that the order is not prematurely finalized. In some embodiments, the order system can include an automatic finalization button to allow the restaurant sufficient time to prepare the order.

As illustrated on FIG. 11B, once the order is placed and at least a first provisional input has been sent to the restaurant, the order summary may be displayed on the computing device 10000. Moreover, the provisional input may be changed through a selection to edit until the order finalization has been initiated. In some embodiments, after the order is placed, the entire group—each customer that is a part of the group order—may review a summary of the order. The summary of the order can, in some embodiments, provide the order number 11002 to help the group confirm that the order pertains to their multiple orders. Additionally, the summary of the order, as shown in FIG. 11B, can include a listing of the customers 11016 that ordered as a part of the group, the type of order 11018, the status of the order 11020, and the predicted order completion time 11022.

For example, the listing of the customers 11016 can include the expected members of the group based on the one or more pieces of contact information that was received and specified prior to the order. In some embodiments, the listing of the customers 11016 can highlight which expected customers placed an order and which expected customers did not order with the group.

Additionally, the type of order 11018, in some embodiments, can identify whether the order is going to be picked up or delivered through a third-party. In certain embodiments, the type of order 11018 may specify exactly which group member is anticipated to pick up the order. In some embodiments, the status of the order 11020 can show each item ordered by the group and whether such item is ready or being prepared.

In certain embodiments, the order completion time 11022 may be provided by the restaurant. In such an embodiment, the order completion time 11022 pertains to the entire group order, which can be picked up as a single order even though it was placed by multiple different customers on multiple different devices.

In some embodiments, the display after the order selection can also include a payment button 11024, which can take the customer to a payment screen. In some embodiments, the payment button 11024 can allow a customer to pay for the entire group order. In other embodiments, the payment button 11024 can allow a customer to pay for his or her particular order without paying for the other orders in the group.

Figure 12:
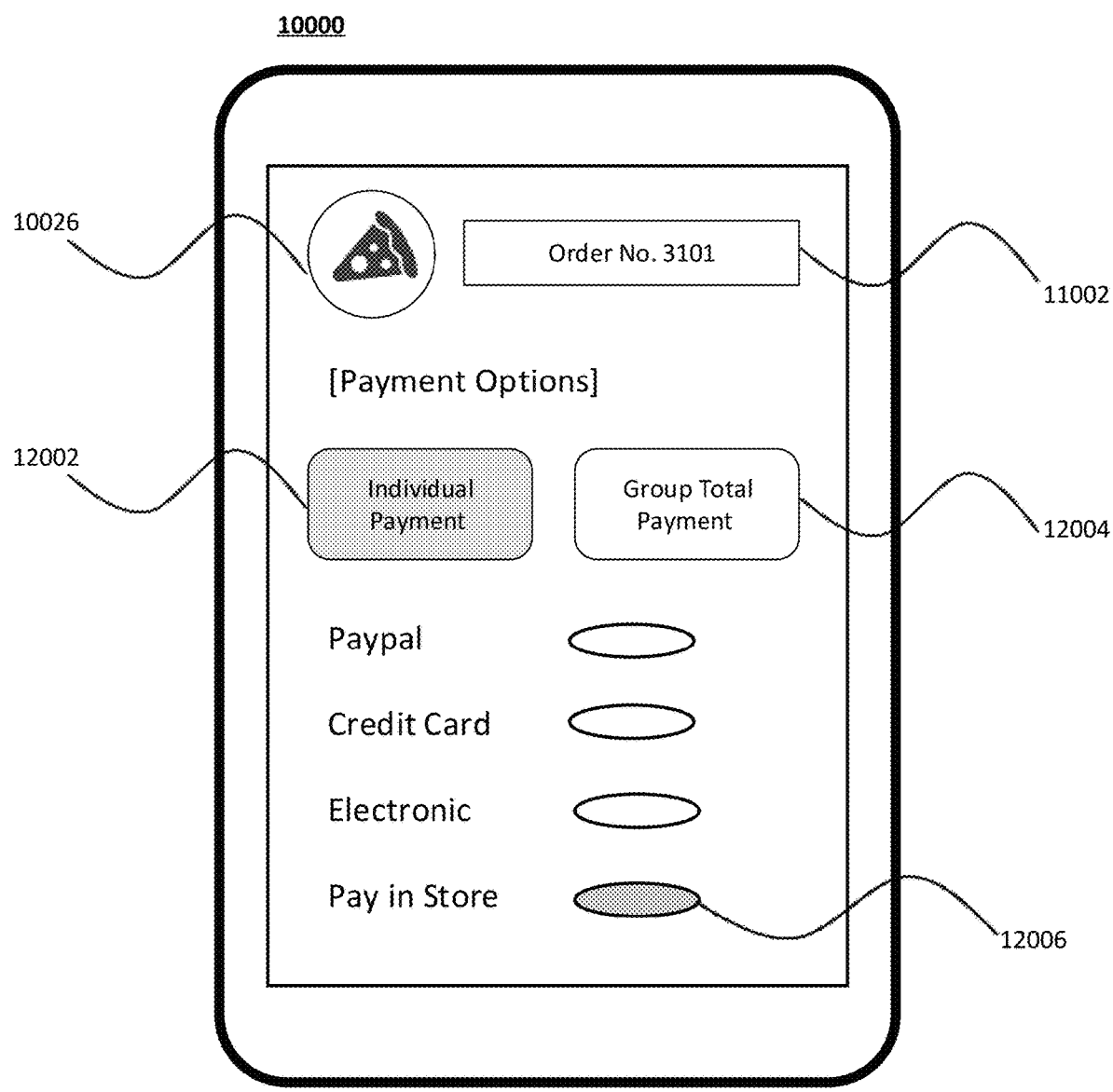
FIG. 12 is a schematic view of a possible mobile device display of an embodiment of the present disclosure showing a payment option screen.

FIG. 12—Payment Mobile Display Screen

FIG. 12 provides a schematic view of a possible mobile device display of an embodiment of the present disclosure showing a payment screen for a group order.

In some embodiments, the payment process for a group order is pre-determined by the customer responsible for organizing or initiating the group order. For example, if a customer begins a group order, the customer may select that he or she will personally pay for the entire group ordering.

Figure 16:
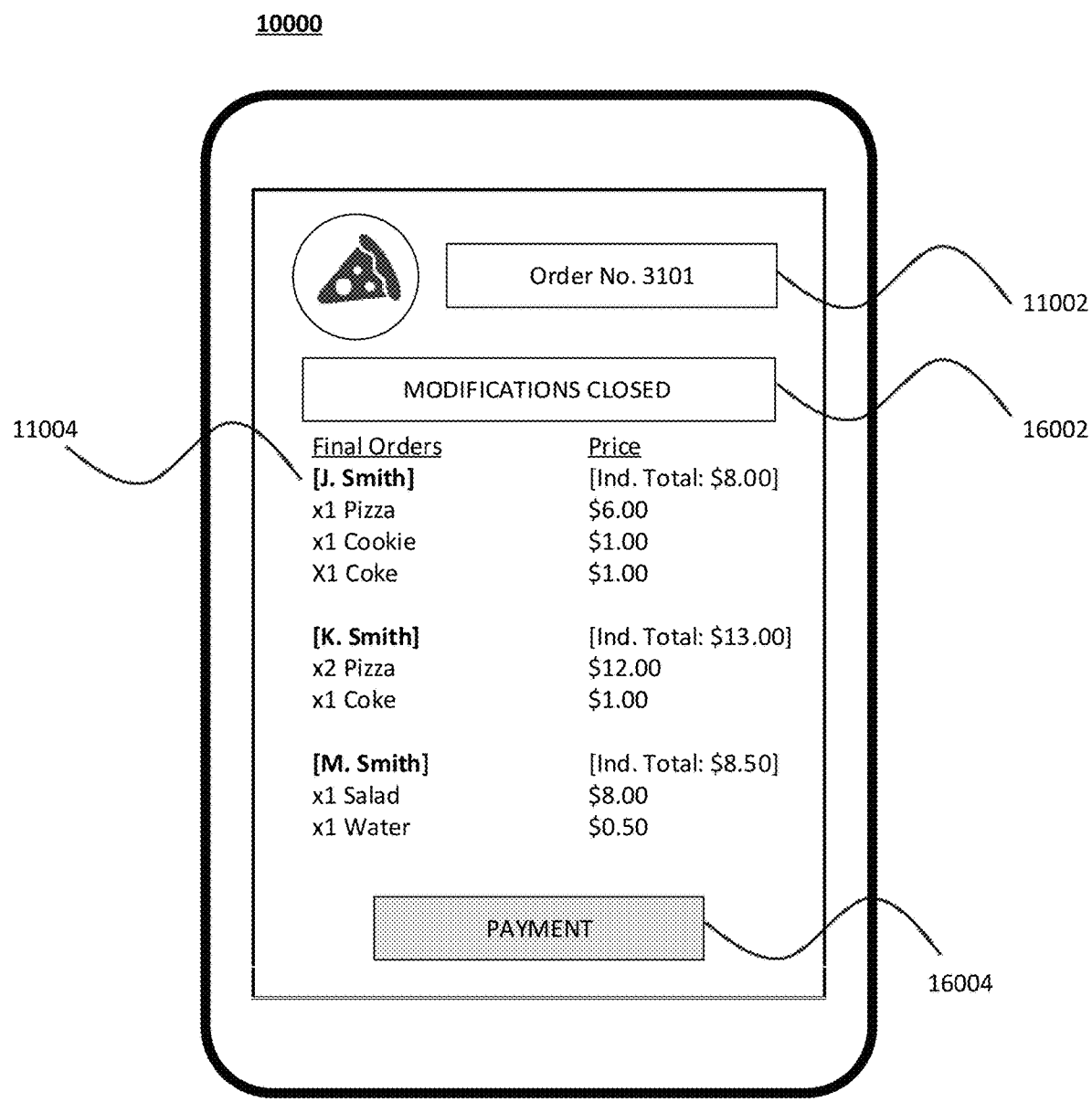
FIG. 16 is a schematic view of a possible mobile device display of an embodiment of the present disclosure after a coordinated order is closed for modification.

In such an embodiment, the customer will next be prompted to select payment type and input payment information, which will then be charged after the time for modification is closed, as is further discussed and shown in FIG. 16.

Further, in some embodiments, the customer that is organizing a group order may be brought to the payment selection screen on the user device 10000 directly after initiating the group order. In this embodiment, the customer would provide payment information before the other customers in the group order begin selection of menu items. Accordingly, in such an embodiment, the customer organizing the group order may provide payment information prior to the other customers input their contact information (corresponding to the screen shown in FIG. 10B).

In other embodiments, the customer organizing a group order can pre-select that each guest will pay for his or her own meal. In such an embodiment, the individual customers may be brought to a payment screen on the user device 10000, as illustrated on FIG. 12. In such an embodiment, while the customer may to select options for payment using their mobile device or may select to pay at the store 12006, the customers (apart from the customer organizing the group order) will not be able to adjust whether the payment is for the individual or the group. For example, in such an embodiment, the an individual payment selection 12002 or a group payment selection 12004 would not be active on the user device 10000 screen.

In some embodiments, if the customer selects a payment option, the customer is asked to make required payment, as illustrated in FIG. 12. When the customer selects to make a payment, the user device 10000 may depict a screen that confirms the transaction pertains to the customer's group order based on the provision of the restaurant identifier 10026 and the order number 11002.

The customer can then, in some embodiments, have the choice to pay for the order through an individual payment selection 12002 or a group payment selection 12004. For example, if the customer selects the individual payment selection 12002, then the customer would only be charged for the portion of the group order that includes menu items that the particular customer selected. Whereas, in an embodiment where the customer selects the group payment selection 12004, the customer can pay for all of the menu selections in the group order. Further, in such an embodiment, the customer may be able to select options for payment using their mobile device or may select to pay at the store 12006.

In certain embodiments, only electronic payment from a customer's mobile or computer device connected by the internet (or other distributive computing method or connectivity method) is accepted as payment. There are many mobile payment systems available and more are being developed all the time. These include Square Wallet, virtual prepaid cards, Google Pay, Apple Wallet, Android Pay, Dwolla, and the like. In some embodiments, there is provided a kiosk at the restaurant location for payment by credit card, cash, other payment means, or combinations thereof. Also, in some embodiments, there is provided a customer service representative (order taker) in the location parking lot that will have a mobile device for taking orders and payments.

Figure 13:
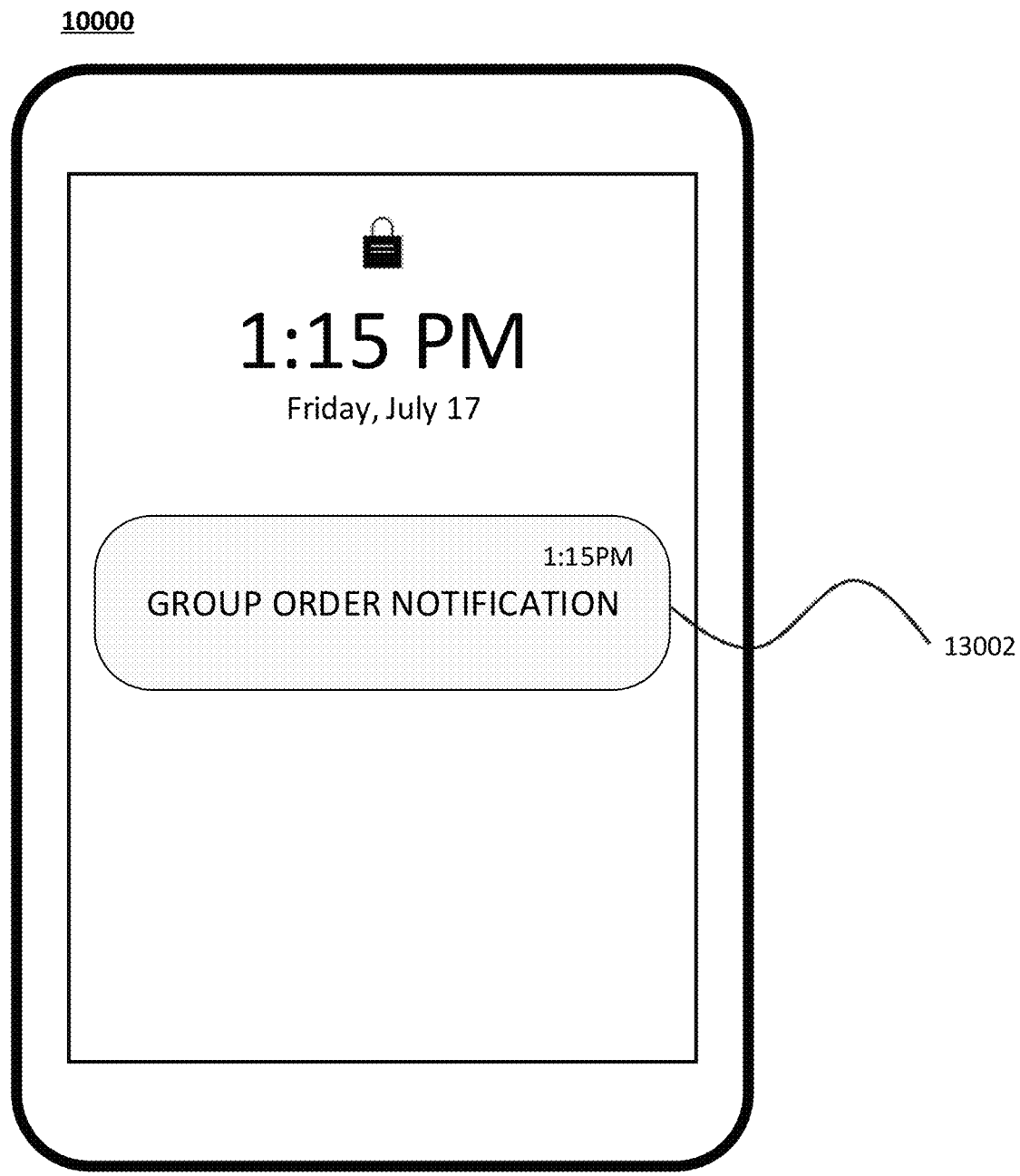
FIG. 13 is a schematic view of a possible mobile device display of an embodiment of the present disclosure showing a notification sent to one or more corresponding customers.

FIG. 13—Confirmation Mobile Display Screen

Referring to FIG. 13, which is a schematic view of a possible mobile device display of an embodiment of the present disclosure showing a notification sent to one or more corresponding customers, 10000 is a user device showing a group order notification 13002. In some embodiments, the group order notification 13002 can alert a customer that a group that shares contact information with the customer has begun an order. For example, if a business is ordering for its employees, the group order notification 13002 may be sent out to each employee's user device 10000 to ensure that the employees are aware of the group order. In some embodiments, the group order notification 13002 can alert customers to update regarding the group order. In certain embodiments, the group order notification 13002 can relate to payments made in respect to the group order.

Figure 14:
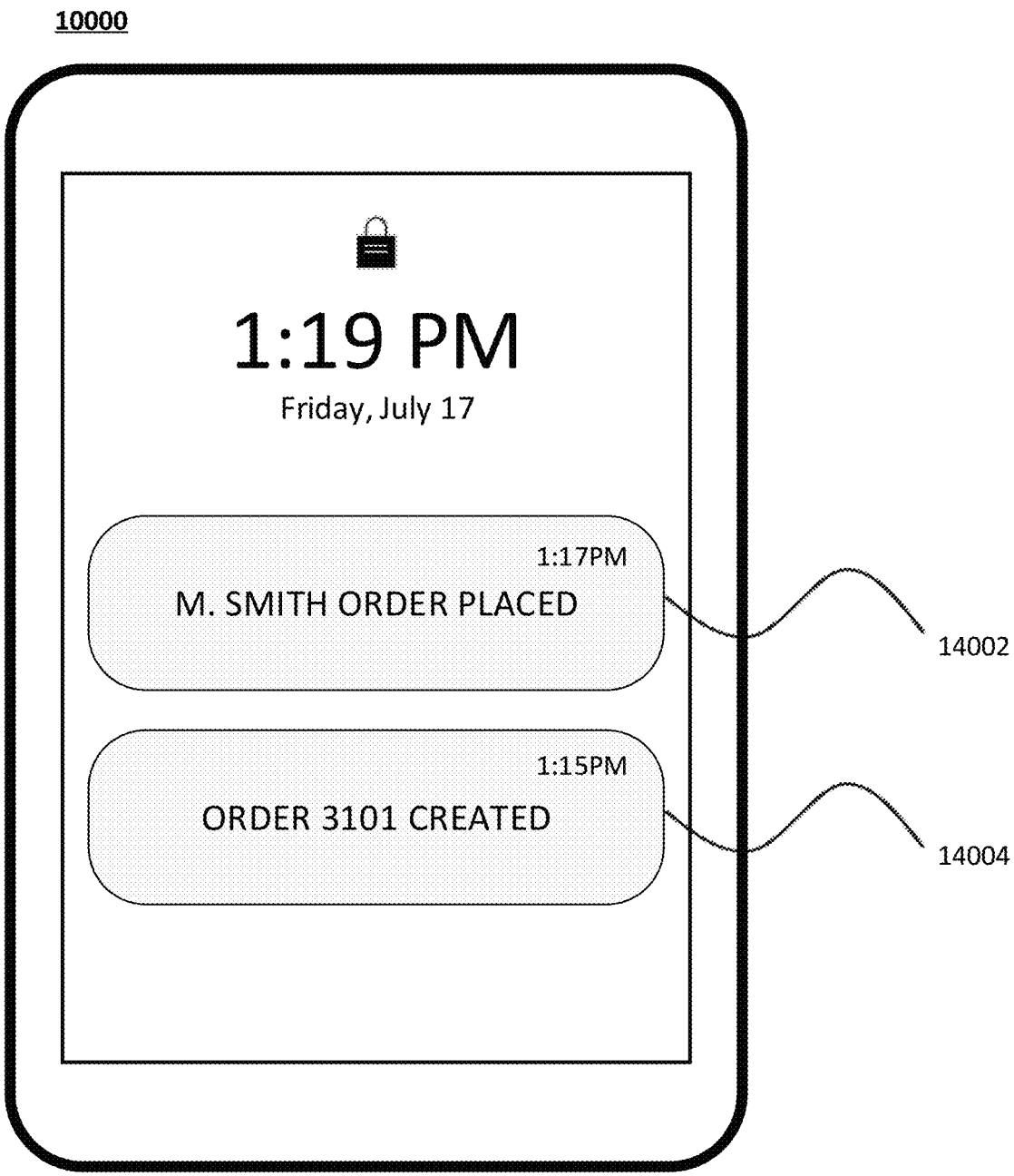
FIG. 14 is a schematic view of a possible mobile device display of an embodiment of the present disclosure showing a confirmation message sent to a customer.

FIG. 14—Delivery Information Mobile Display Screen

Referring to FIG. 14, which is a schematic view of a possible mobile device display of an embodiment of the present disclosure showing a confirmation message sent to a customer, 10000 is a user device showing an order placement confirmation message 14002 and an order creation confirmation message 14004. In some embodiments, the customer that begins the group order can select to receive one or more confirmation messages to ensure that the group order is being handled by the coordinated system. For example, a customer that begins a group order can select to receive a confirmation—in the form of an order creation confirmation message 14004—when the group order is begun and the rest of the group is notified. In some embodiments, a customer that begins a group order can select to receive confirmation when each other member in the group places an order through an order placement confirmation message 14002. In some embodiments, the selection to receive a confirmation message can be present for each of the customers involved in the group order.

Figure 15:
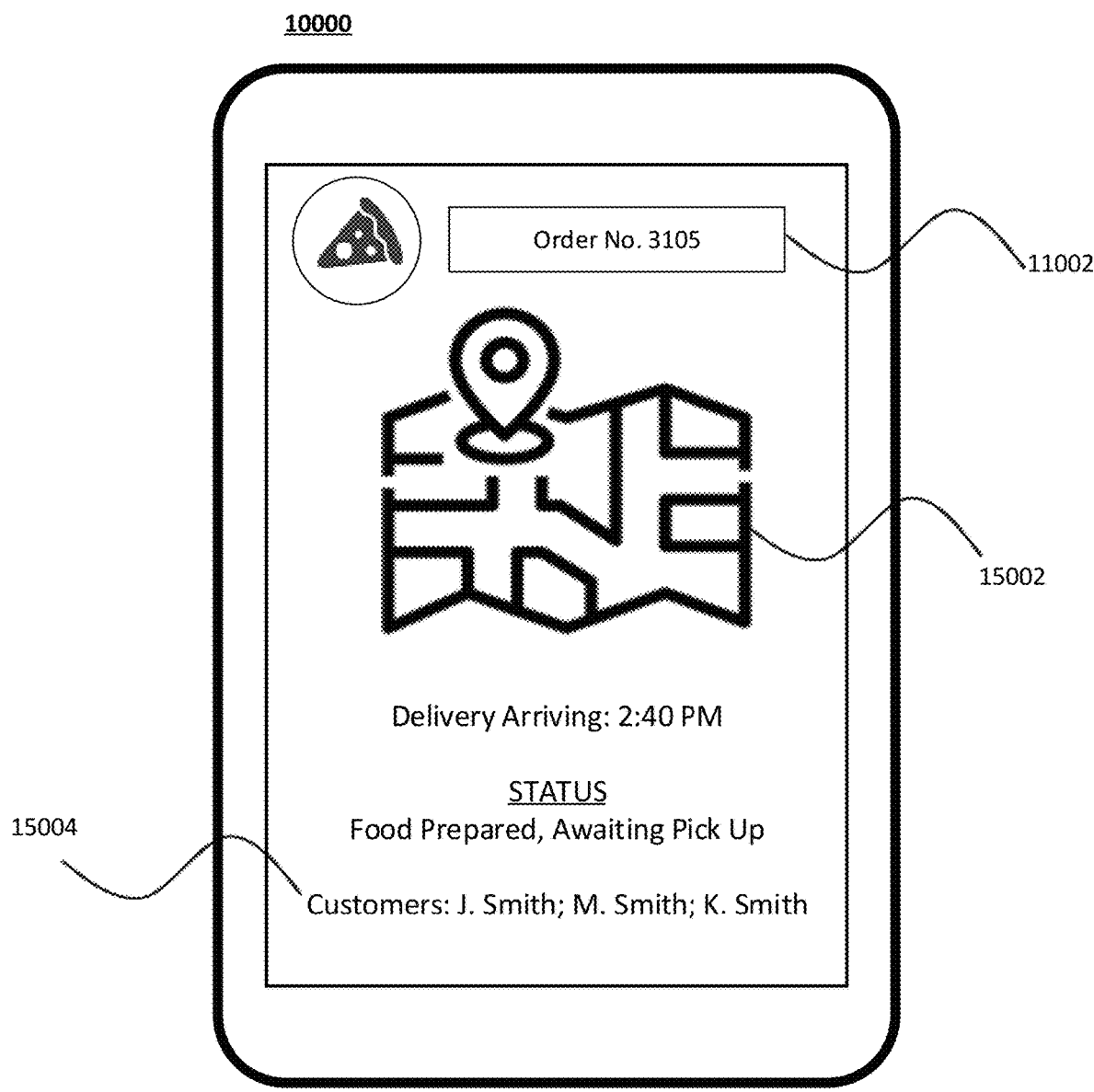
FIG. 15 is a schematic view of a possible mobile device display of an embodiment of the present disclosure showing delivery information.

FIG. 15—Status Mobile Display Screen

Referring to FIG. 15, which is a schematic view of a possible mobile device display of an embodiment of the present disclosure showing delivery information, 10000 is a user device showing the delivery details for a particular order based on the order number 11002. In some embodiments, the customers can view the delivery details once the group order has been placed. In particular, in such an embodiment, each customer involved in the group order may view the progress on the delivery. In some embodiments, the real-time information regarding the delivery driver may be tracked and displayed on a real-time map 15002. Further, in some embodiments, the display can also include delivery information 15004, including but not limited to, the status of the food that was ordered by the group, the customers in the group order, and the expected time and place of delivery. In some embodiments, the delivery driver may also view the delivery information screen including the delivery information 15004. In such an embodiment, the delivery driver can use the delivery information to confirm that the group order is delivered to the corresponding group that placed the order.

FIG. 16—Final Order Mobile Display Screen

FIG. 16 depicts a schematic view of a possible mobile device display of an embodiment of the present disclosure after a coordinated order is closed for modification.

As shown in FIG. 16, in some embodiments, when the order has been placed for a particular amount of time, the order can be closed for modification. In some embodiments, the particular amount of time may be determined by the customer beginning the group order. In another embodiment, the particular amount of time before modifications are closed may be set by the restaurant. When the order can no longer be modified, as shown in FIG. 16, the user device 10000 can present a screen summarizing the final order. In some embodiments, the final order can presented with confirmation information, including for example the order number 11002, to allow the customers in the group to ensure that the summary relates to the expected group order. In some embodiments, the final order summary can explicitly show that modifications are closed through the inclusion of a modification closure notification 16002. In some embodiments, the final order can be organized alphabetically based on the customers in the group order.

In some embodiments, once the modifications are closed, the summary presents the customer identifiers 11004 for those customers in the group that placed orders along with their final order. Additionally, in some embodiments, once the modifications are closed the remaining selection is a payment button 16004, which can take a user to the screen on the user device 10000 depicted in FIG. 12.

Figure 17:
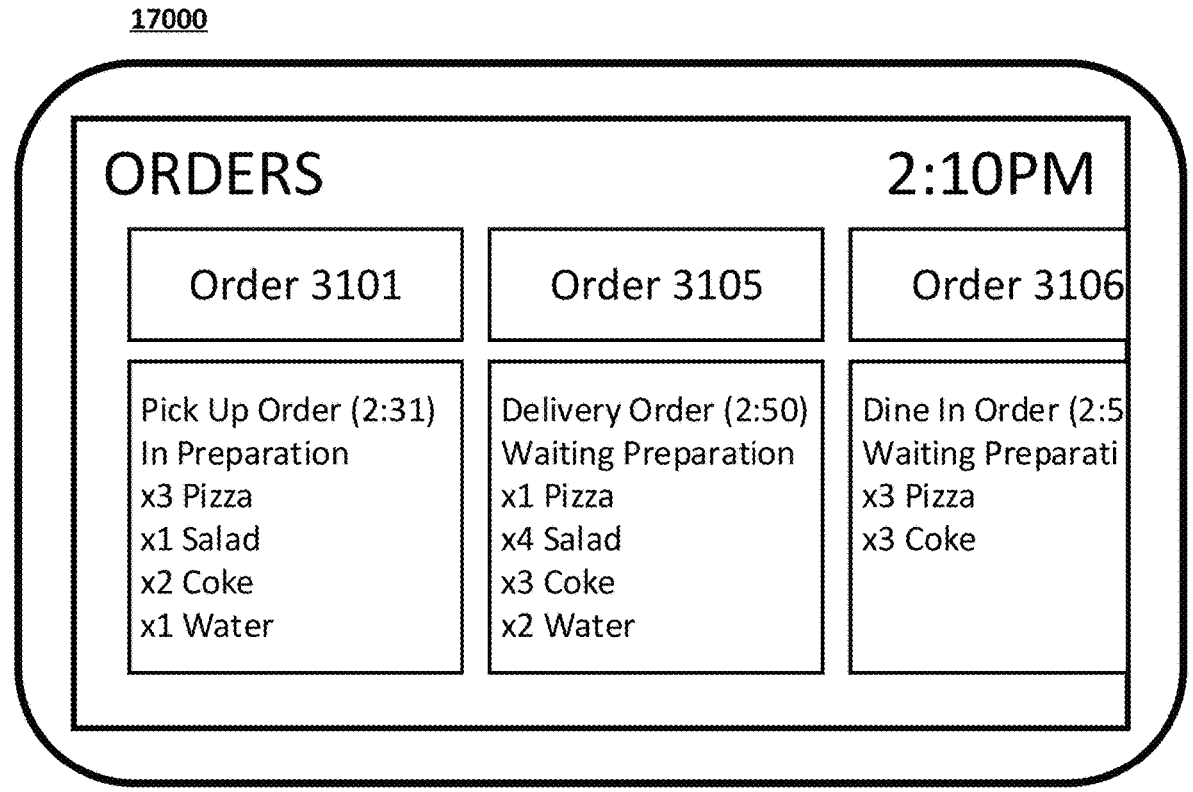
FIG. 17 is a schematic view of a possible visual display in the restaurant of an embodiment of the present disclosure after an order has been placed on a mobile device.

FIG. 17—Restaurant Visual Display Screen

In various embodiments, shown in FIG. 17, the restaurant can utilize displays that present the information collected and determined by a system for coordinating ordering from the restaurant location.

As shown in FIG. 17, at the restaurant location, a screen 17000 can be present to display information to the restaurant employees—including cooks, employees, and wait staff—that allows for item preparation of the coordinated order. In some embodiments, the screen may list the orders that are currently received from dine-in customers. Additionally, as displayed as an exemplary embodiment in FIG. 17, the orders may be listed as a queue that is sequenced with the earliest order fire time being displayed first in the queue. As shown on screen 17000, the orders can be grouped by order number. Accordingly, in such an embodiment, the restaurant can prepare a group order—placed by different customers on different devices—as a single order that is treated no different than if the order was placed by one customer off of a single device.

The screen 17000 in the restaurant location, including that shown in FIG. 17, can be communicatively coupled with the systems that are processing the customer orders from various devices. The data processing unit and associated data storage will suitably be a computer programed and running software to perform the functions described. Implementation of such a data processing system is well within the capabilities of those skilled in the art.

Figure 18:
FIG. 18 is a schematic view of a possible visual display in the restaurant of an embodiment of the present disclosure showing status of an order.

FIG. 18—Customer-Facing Visual Display at Restaurant

Beyond the staff-facing visual display shown in FIG. 17, the dine-in restaurant location can include customer-facing visual displays 18000, such as the display shown in FIG. 18, for use in the dining and pick-up area of the restaurant. In some embodiments including such customer-facing visual displays, as shown in the illustrative embodiment of FIG. 18, the particular order number that is associated with a group order is specified. In such embodiments, the customers may utilize the customer-facing visual display 18000 to determine whether the food orders are ready for pickup, delivery, or dine-in. By allowing the customers to locate their order, the customer-facing visual display 18000 shown in FIG. 18 can help to reduce wait time at the restaurant location.

In some embodiments, the customer-facing visual display shown in FIG. 18 includes whether food and drinks have already been packaged, are in the process of being prepared, or have yet to be prepared. For example, the customer-facing visual display may show that drinks are ready for pickup (and can be brought to a car) and that the food is about to be ready to pickup.

Further Components and Variations
Presence Detection and Approaching Customer Identification In various embodiments, the restaurant location is provided with presence detection means (as discussed elsewhere herein), vehicle identification means (as discussed elsewhere herein), or both. In some such embodiments, the vehicle is identified as it approaches the order pick up window, and the identification is provided to wait staff. In some such embodiments, the wait staff select the order for the customer approaching the window, place the prepared orders in the order that customers are approaching the window in the order pick up lane, or both.

In some embodiments, a customer's license plate is associated with their order. The license plate identification sequence ('number'), in various embodiment and in various situations, is entered automatically by a license plate reader apparatus, is entered by the customer placing the order, is entered by a staff member taking the order, or other suitable means. In various embodiments, another identification means is used alternatively or in combination, including an image of the vehicle, an order number, a color and make of the vehicle, a one-dimensional or multi-dimensional scan code (such as a barcode, QR code, etc.), a store-provided order device (such as a device with a unique number that alerts the customer when an order is ready, and can also be identified by the restaurant location to direct customers when to merge), a mobile device (mediated, in some embodiments, by an application), etc.

In various embodiments, the order processing system automatically notifies customers to merge when the order is marked ready, at a specific time (e.g. a pre-determined amount of time before the calculated order ready time) or event (e.g. a trigger time, status change of order directly in queue before the customer's order to 'ready', etc.), another suitable trigger, or combinations thereof.

Lane Merging

In some embodiments, the restaurant location offers both a drive-through order lane(s) and a non-sequential order pick up window(s). Such embodiments are particularly advantageous for restaurant locations with existing traditional drive-through order lanes, or with a significant customer base that wishes to preserve a traditional drive-through ordering experience. In some such embodiments, an ordering lane is provided with a linear, sequential-access drive-through lane, where customers enter the lane, approach the ordering window, and place their order. At this point, customers do not wait to receive their order—thereby holding up other customers waiting to place their order.

In some embodiments, they directly merge into a non-sequential access drive-through lane as their order is ready. In some embodiments, they enter a waiting area, in common with people who have placed mobile or online orders, and enter a non-sequential drive-through lane as their order is ready (e.g. when they are notified by an order-ready board, by a text message, notification device handed to them at the order placement window and returned to the restaurant at the pick-up window, etc.). In some such embodiments, the customer is directed to circle the restaurant building and enter a waiting area, such as non-sequential waiting spaces, non-sequential queue lanes, parking spaces, etc.

The restaurant location can, thus, offer drive-through ordering and payment, while still preserving the convenience and time advantages to customers who have pre-ordered. Customers who wish to order at the location (order-in-line customers) can do so, while customers who wish to pre-order can pick up their order as it is ready, without being trapped in line behind order-in-line (non pre-order) customers.

Some embodiments merging a sequential drive-through order line with a non-sequential order pick up line are provided with merging control means to control the flow of traffic from multiple lanes into one (or at least into fewer) non-sequential order pick up lane. In some such embodiments, the merging control means comprises one or more presence detectors, such as a magnetic loop embedded in the road, ultrasonic sensor, video sensor, radar sensor, or other suitable apparatus.

The merging control means, in some embodiments, further comprises signaling means to direct traffic from various lanes when to enter the non-sequential pick up lane. In some such embodiments, the signaling means comprises a light signaling system for merging, such as having a red and green (or other suitable colors) for each lane. When a customer is to enter the non-sequential pick up lane, the light for their lane turns green. In some such embodiments, direct access (as opposed to access from the ordering/payment lane(s)) to the pick-up lane (such as from the parking lot, from queuing spaces and/or lanes, etc.) is 'green' (for go/enter) by default, while access from the ordering lane is 'red' (for stop/do not enter) by default. When the next order in line in the ordering/payment lane is ready, the direct access lane signal switches to 'red' (or other 'stop' signal), and the access from the ordering lane switches to 'green' (or other 'go' signal). In various embodiments, other appropriate signaling is used, such as words, rotating signs, audible signals, text messaging, etc.

Embodiments with an ordering lane merging directly into a pick up lane preserve the advantages of non-sequential access to order pick up based on order ready time, thereby preserving efficiency for pre-orders, and preserving order pick up time accuracy (e.g. not unnecessarily extending order pick up time by forcing customers to wait on orders being placed, prepared, and delivered in sequence)—customers are enabled to 'jump the line' at the restaurant by pre-ordering. Such embodiments are particularly useful for locations that are presently relatively traditional, sequential access ordering/payment I pick up locations, allowing them to add a 'jump the line' feature for non-sequential order pick up to incentivize customers who prefer the advantages of pre-ordering instead of waiting in line.

In some embodiments, such as some referenced above, a further advantage is added by extending the benefit of non-sequential order pick up to drive-through ordering customers. Such embodiments include those in which traditional drive-through order/payment I pick up locations are converted into non-sequential pick up locations by providing a non-window ordering and payment station. Such embodiments are particularly useful for locations that do not have the capability for two or more windows, or merging lanes together. Locations with only one window will, in some embodiments, convert their window into a non-sequential pick up only window.

Various such embodiments are provided with at least one of: an ordering station with a microphone, separate from the flow of the non-sequential pick up window; an ordering kiosk without a microphone; an ordering kiosk with a touchscreen with or without a microphone; one or more attendants with mobile ordering and payment stations (such as a tablet) in the parking lot; or other suitable means for taking orders. All such order and payment taking means, at least when used in these embodiments, are placed outside of the flow of the non-sequential order pick up window lane(s), thereby preserving customer access to the order pick up window when their order is ready. All such order taking means preferably accept payment as well. Some are capable of accepting cash, checks, or both, while others only accept electronic forms of payment (such as at least one of debit and credit cards, Apple Pay, Paypal, Google Pay, Venmo, Bitcoin, etc.).

In some embodiments extending the benefit of non-sequential order pick up to drive-through ordering customers, at least one ordering lane is provided. The ordering lane provides access to a plurality of queuing parking spaces, enabling a customer to place an order and pay for it, and then move to a queuing space and wait to enter the non-sequential order pick up window just like pre-order customers. Such embodiments can, in a measure, provide the 'best of both worlds' for pre-order and drive-through-ordering customers, allowing both to order in their preferred way, while also allowing both pre-order and drive-through-ordering customers to pick up their order in a non-sequential manner according to the order-ready time.

Multiple Order Channels

In some embodiments, the restaurant merges orders from multiple order-receiving channels, and distributes the orders after preparation back out to the proper channel. Channels include, in various embodiments, at least one of: custom mobile phone application, custom website, third-party app, third-party website, or food services (such as GrubHub, Favor, FourDoor, Dash, etc.). In some such embodiments, the restaurant provides a separate pick up area, a separate order pick up window, or both, for delivery services. In such embodiments, a third-party delivery driver comes to a designated pick up area I window, while a direct customer comes to a different pick up area I window. In some embodiments merging orders from multiple order-receiving channels, the order-receiving channels are reduced by restricting all orders from the order pick up window, and re-directing them to another channel (such as mobile ordering).

Multiple Locations

In some embodiments, a common ordering system is provided across multiple restaurant locations. In some such embodiments, calls for multiple locations are routed to a common call center (or regional call centers). Such embodiments allow a single call center for multiple stores, which provides advantages to customers and restaurant staff. Restaurant staff are calmer—wait staff are not having to handle juggling phone calls, or at least not the same frequency of phone calls, and wait staff do not have the problems with hearing customers due to the background noise of a busy restaurant. Customers receive calmer, more focused service, less background noise, and more accuracy in their orders. The ability to call is useful, for example, for people who want to pre-order but are not comfortable with mobile or online ordering, for larger orders that are inconvenient or unable to purchase over the online or mobile ordering system, and for questions regarding policies, menu, service, billing issues, etc.

Order Selection Accuracy

In many embodiments, the system and methods are optimized for accurate order delivery (including handoff at an order pick up window) to the customer. When the orders are prepared and waiting for pick up, it is always a risk that the wrong order is handed off to the wrong customer. This is particularly challenging when there is more than one order pick up window. It is also particularly challenging when there are multiple customers with the same name, if the name is used to identify the order.

In many embodiments, order accuracy is increased—as well as operational efficiency—by enabling a single order pick up window to be used, because the customers in the drive through at any given time are greatly reduced by non-sequential access as the orders become ready (as discussed elsewhere herein). In some embodiments, the order system displays order information on screens (such as a tablet, a computer screen, an order display in the production area, etc.). In some embodiments, the order system prints off a sheet for each order, or a sheet with multiple orders, with the relevant details of the order for wait staff to use in production and delivery.

In some embodiments, as discussed elsewhere herein, the staff are notified as a customer is approaching the order pick up window, and given identifying information on the customer (such a license plate, order ID by identifying a mobile device in the customer's vehicle, etc.), giving staff time to locate and double-check the order before the customer appears at the pick-up window. In some embodiments, the order system highlights 'doubled names' to alert staff that there are multiple orders with the same or similar identifying information. Various embodiments highlight doubled identifying information—customer-input order ID, vehicle physical characteristics, customer name, etc. In some embodiments, a unique ID is provided to each order that prevents doubling.

Customer Locating

The order system is also capable, in some embodiments, of acquiring the location of a customer by receiving information from a global positioning system (GPS) system in the customer's mobile device or computer. GPS coordinates of the ordering customer is received from their mobile device and sent to the ordering system, or locating service or system connected to the ordering system, to aid in calculating travel time to better estimate a "future" pick up time. This is especially helpful for a restaurant along a highway. Potential customers can search down their travel route for a suitable restaurant, order using their mobile device, and have the system tell them how much time is required to reach the destination pick up location. Operation of a similar GPS system for ordering is disclosed in US published application U.S. 2006/0293971, the relevant disclosures of which are incorporated herein by reference. U.S. Pat. No. 8,059,029 discloses a GPS tracking system with helpful information on the way and means to set up an appropriate GPS ordering system. The relevant disclosure of U.S. Pat. No. 8,059,029 are incorporated herein by reference.

In another embodiment the same GPS tracking is used to enable drone delivery or any other delivery method to static locations or moving vehicles while in transit. For the example above, the customer may wish to order, but not stop; preferring to have a drone meet the moving vehicle with the food order.

Mapping

In some embodiments, the ordering system is provided with, or connected to, mapping software. In some such embodiments, the ordering system is provided with internal maps with delivery-time zones, used to calculate delivery time to the customer's location. In some embodiments for multi-location restaurants, the ordering system is further provided with store-delivery-range zones. The customer's location is determined, and the order is routed to the appropriate location to make and deliver, based on store-delivery-range zones. In some such embodiments, some locations provide delivery service, and some do not; in such embodiments the ordering system routes delivery orders only to locations providing delivery service. The ordering system takes delivery time into account in queuing the order and providing an estimated order delivery time, as discussed elsewhere. It is a particular advantage to accurately estimate delivery time for the customer and for production timing and slip-logic, as for many restaurants and locales, delivery time is greater, and often much greater, than production time. Accordingly, providing accurate timing to the customer, and efficient production, relies heavily on reasonably accurate delivery timing and estimation.

In some embodiments, the restaurant is listed with at least one mapping service or app (such as Google Maps, Apple Maps, Bing Maps, OpenStreetMaps, MapQuest, Yahoo! Maps, Wikimapia, etc.), travel service or app (such as Tripit, Airbnb, Roadtrippers, TripAdvisor, etc.), or other such service or app. A customer is preparing a trip, or is on the road, and searches restaurants near a given location. When the restaurant appears on the search, and is selected by the customer, the ordering system (an app, website, or other suitable means) receives a customer's location from the app or service (such as through attributes of the URL passing location (such as a 'GET' method), variables passed through an application programming interface (such as a 'POST' method), permission to access the current location of the customer from the device directly, etc.).

The order system highlights menu options that will be ready by the time the customer arrives, restricts items that will not be ready, or some combination thereof. The customer places the order as discussed elsewhere herein, and the restaurant prepares the order likewise. The customer can, in such embodiments, have a meal ready for them—potentially higher quality than fast food in terms of taste, options, health, etc.—with minimal delay in their trip.

In various embodiments, the order system estimates the time from the customer's current location to the restaurant location by at least one of: receiving an estimated travel time from the mapping service or app, receiving a distance from the mapping service or app and calculating an estimated travel time therefrom, receiving a current customer location from the mapping service or app and using a third-party mapping service to estimate travel time, receiving a current customer location from the mapping service or app and using an internal mapping algorithm to estimate travel time, other appropriate means, or some combination thereof.

In some embodiments, at least part of the ordering system is provided by a third party, and individual restaurants or restaurant chains have the option of subscribing to or otherwise participating in this multi-vendor ordering system. In some such embodiments, the multi-vendor ordering system integrates with one or more mapping services or apps—which in various embodiments are third-party or are directly incorporated into the software.

In such embodiments, customers can search a map for restaurants near a given location, or along a given route. The customer can filter for restaurants participating in the multi-vendor ordering system (or the search is restricted only to participating restaurants), and then can place an order seamlessly. The multi-vendor ordering system presents ordering information to the customer, and sends the order to the restaurant. In some embodiments, the multi-vendor ordering system at least handles all interaction of the customer with the ordering system, such that the customer never has to leave the unified interface, and may order from one or more restaurants directly from the interface.

In some embodiments, the multi-vendor ordering system allows restaurants to customize the look and feel of the menu on their ordering system, within general system or app parameters.

Various embodiments using mapping and order systems allows the customer to order through virtual assistants, such as Cortana, Siri, Alexa, Google, etc., using voice commands. It is said that the most common restaurant internet (including mobile) search is "restaurants near me." It may well become "restaurants on my route." The present disclosure provides advantages, for example, in convenience and increased choice to customers. It also provides advantages, for example, in efficiency and increased customer engagement and potential customer base for restaurants.

Delivery

In some embodiments, the restaurant provides external order delivery service, actually delivering the order to a customer-specified location. In some embodiments, the restaurant provides external order delivery through at least one third-party delivery service (such as GrubHub, Favor, FourDoor, Dash, etc). In some embodiments, the restaurant provides external order delivery at least through restaurant-specific delivery personnel, whether employees or contractors. In some embodiments, the external order delivery personnel pick up orders to deliver to customers at the order pick up window. Such embodiments provide easy integration of delivery drivers; the non-sequential access prevents delivery personnel from unduly interfering with the flow of customers.

In some embodiments, the personnel pick up orders to deliver to customers at a separate location, such as a dedicated delivery-personnel order pick up window. Such embodiments are especially useful for locations with relatively high volumes and/or relatively high percentages of external delivery orders, separating the delivery personnel from the flow of normal customer pick up traffic, and preventing delivery personnel traffic from slowing down the flow of customer pick-ups, particularly when the drivers are picking up multiple orders to deliver. Such embodiments having a dedicated delivery personnel order pick up window preserve the efficiency of non-sequential access for drivers, especially by eliminating the need for drivers to find a parking space and enter the restaurant.

In some embodiments, a customer is provided with the option to convert their pick up order to an external delivery order. For example, a customer may have placed a pick up order, received an order-ready time (for example, of 15 minutes), and planned to leave the office in 10 minutes, drive for 5 minutes, and pick up the order when ready. If the customer then became engaged in a meeting, phone call, car refused to start, etc., the customer can access the order again (e.g., on a mobile device, computer with online access, telephone, etc.) and request that the order be converted to a delivery order. The order is assigned to a delivery driver, and the order-delivery time is then calculated. No interruption of restaurant workflow is caused, and the customer can still conveniently receive their order.

Such an embodiment works particularly smoothly in a location with an order pick up window for customers and delivery drivers, where the order is simply picked up by a delivery driver instead of the customer. The order system is updated to indicate pick up by the delivery driver, and the restaurant wait staff can verify the order pick up person accordingly. In embodiments having a separate delivery driver window, the order can be transferred to the delivery driver pick up area in the restaurant, or a shared area having access to the customer order pick up window(s) and the delivery driver order pick up window(s).

In some embodiments, the order system allows the customer to designate another person, such as a family member or third-party delivery driver, to pick up the order. The customer can, in various such embodiments, designate another person by email, phone number, name, etc. In some cases, in some embodiments, the ordering system allows the customer to send the order, or certain data regarding the order, directly to the designated person. The order system updates the information associated with the order, and wait staff at the restaurant location can validate the person picking up the order against the information in the order system.

Location-Triggered Order Preparation

In some embodiments, the ordering system is optimized for fresh-cooked food, which is particularly advantageous for restaurant locations that specialize in food being just prepared as the customer receives it. In some such embodiments, the ordering system is provided with internal or external maps, and the capability of estimating travel time to the restaurant location(s), either internally, or through connection with an external module or system. Customers with mobile devices having location abilities (such as equipped to communicate with global positioning system (GPS), GLONASS, etc.). The mobile device (potentially embedded in a vehicle) runs a software (such as mobile app) that conveys the customer's location to the order system. The order system monitors the customer's location, calculates the time required to arrive, and triggers order preparation to start once the calculated time from the customer's current location is approximately the same as the order preparation time.

In various embodiments, positive or negative buffers are added to increase the likelihood of the order being ready when the customer arrives (positive buffer—time is added), or to make sure that the order is being completed as the customer arrives (negative buffer—time is subtracted)—such as for a restaurant that completes and serves an order in the presence of the customer. In some embodiments, the system does not continually calculate the time from the customer's current location to the restaurant location, but instead is provided with a pre-determined distance range from the restaurant location: when the customer enters that range, the order system triggers preparation of the order.

In some embodiments, mobile devices, vehicles, etc. having software reading at least one inertial sensor (such as accelerometer, gyro, etc.), and the customer inputs the location from which they will be departing. Once the software (such as a mobile app) detects steady motion of the mobile device or vehicle rate indicating the customer is driving, the software notifies the restaurant location. The restaurant location calculates (or has previously calculated) the distance from the customer's location to the restaurant location, as well as the time required for order preparation, and begins preparation of the order in time for it to be finished at or about the time the customer arrives.

EXAMPLE EMBODIMENTS

Example 1

In some embodiments of the present disclosure, a coffee shop with in-store service and a typical drive-through window is adapted for non-sequential order pick up. In some such embodiments, the window is converted to order pick up only, or an additional order pick up only window is added. In either case, the order pick up window has direct access, and no microphone, and is designed to not be blocked by traffic that is ordering. In some alternative embodiments, an ordering station is provided, such as by adapting the lanes to provide independent access to the pick-up window, and to the previous ordering station. The previous ordering station is converted to an independent order placement station, at which customers may place (and, in some embodiments, pay for) their order, and then exit the ordering station and lane, and enter parking or queuing spaces until their order is ready, at which point they enter a non-sequential drive-through lane to approach the order pick up window.

Example 2

In some embodiments, a primarily dine-in restaurant utilizes the ordering system of the present disclosure. In some such embodiments, customers place at least some portion of their order, including a desired dining time, via an internet-connected device or mobile device, by phone, etc., and receives an expected dining time. The ordering system provides the expected dining time by taking into account the current number of tables and seating available, current and expected number of customers, wait staff levels, etc. The restaurant prepares the order, sets the table, and is ready for the customers when they arrive at or near the expected dining time. More than just 'reserving' a table, the ordering system allows the table to be reserved easily, without having to call or stop by the restaurant. It also allows the restaurant to maximize usage of available seating, tables, staff, etc. by reserving for a more accurate time and providing an accurate expected dining time. It reduces the inconvenience and annoyance to customers of standing in line waiting to be seated, by providing them an accurate expected dining time.

Example 3

Some embodiments of the present disclosure comprise a convenience store or travel center that serves food, such as sandwiches, hot dogs, breakfast pastries, tacos, hamburgers, desserts, etc. Customers can pre-order a menu item, or at least choose from a subset of the menu provided in the store. In some embodiments, the store adds a non-sequential order pick up window and associated lane. In some embodiments, the customer picks the order up in-store at a dedicated non-sequential pick up area. Accordingly, the customer can use time during travel to place the order, and minimize time waiting for a hot meal at the travel center, convenience store, etc.

Example 4

Some embodiments of the present disclosure comprise a restaurant offering a customizable build-your-own entree—such as build-your-own sandwiches, burritos, tacos, pizzas, hamburgers, salads, etc. The restaurant accepts pre-orders at least online or through a mobile device, including all or a subset of available customizations. Customers are able to place an order online, including their customizations, and receive an order-ready time (depending on various factors, including whether the order is placed with a desired pick up time or as an ASAP order). The restaurant provides a dedicated non-sequential order pick up area, non-sequential order pick up window, or both, where customers can pick up their order without waiting in line. This provides an especial advantage for customers and restaurants in such locations, where the line typically moves more slowly because of the many choices customers must make during customization. Additionally, customers are easily able to distinguish when placing their order between free and add-on customizations, and the price of add-on customizations, without the annoyance of repeatedly asking restaurant staff or searching a menu or menu board.

Example 5

Some embodiments of the present disclosure comprise a restaurant offering delivery of the order to the customer's desired location through at least one third-party food delivery service, either in combination with, or in place of, restaurant delivery staff. In some such embodiments, the customer requests delivery (versus pick-up) when placing the order, or at some point after placing the order. The order system queues the order as discussed elsewhere herein, and schedules a driver to make the delivery with a third-party food delivery service (such as Favor, GrubHub, etc.). The driver comes to a non-sequential order pick up area (such as a common pick up window for both drivers and customers, or a dedicated driver pick up window), picks up the order, and delivers it to the restaurant.

In various embodiments, the order is initially placed through the restaurant's order system, or through a third party order system (such as for a food delivery service) and then transferred to the restaurant order system. In some embodiments, the restaurant is a food delivery service only location, having a pick up window or area (preferably a drive-through window) with non-sequential access for food delivery service drivers.

In some embodiments, an additional calculated time—driver summons—is provided that is calculated at least based on available drivers, time required for drivers to arrive at the restaurant, and order preparation time. In some such embodiments, the order system obtains information on present driver availability and location through at least one connection to food delivery service systems (such as through an application programming interface). In some such embodiments, the order system does not use or calculate the driver summons time. In some embodiments, the order system queues the order, and reserves a pick up time with a driver. In some embodiments, the order system calculates driver summons time based on the likelihood of a driver being available within a given driving distance (or time, or both), and triggers a summons of a driver when the driver summons time is reached. The driver summons time may be before order production begins, or afterwards, depending on the calculated production time of the order, and the estimated time for a driver to arrive.

Example 6

Some embodiments of the present disclosure comprise a 'fast-food' type restaurant that traditionally does not have a drive-through option, such as many quick-preparation or pre-prepared pizza locations. Such restaurant locations can add a non-sequential access order pick up window (in some such embodiments, the window having no microphone and no provision for placing or paying for an order) and mobile/online ordering, such that customers can order online, and pick up their order at a pick up window. While many such locations would not be able to add a traditional drive through window due to space constraints, the present disclosure, as discussed elsewhere herein, allows the addition of a drive-through pick up window with minimal impacts on available space.

Example 7

The present disclosure is advantageous in various embodiments for locations with restricted space insufficient for current requirements for traditional drive-through order and pick up lines. For example, a restaurant seeking to utilize a location on a corner lot that is ideal for a fast casual food drive-through pick up location due to proximity to target clientele, but prevented from doing so by having a lot too small for the required number of vehicles in a sequential access drive-through lane, can apply an embodiment of the present disclosure in order to utilize the location for drive-through pick up.

In one particular such situation, a location was currently being used for both customer sit down and inside customer pick up, as well as for in-store delivery driver pick up. Customer drive-through order pick up was planned to add to the location, but the lot size, surrounding development, and city requirements prevented a standard, sequential drive-through lane and window to be added, because the length of the lane required to accommodate the number of vehicles at one time required by the city (in order to prevent the wait line from spilling onto the road or adjoining businesses) was too large for the lot. The location incorporated a non-sequential drive-through order pick up window configured only for pick-up of previously placed orders, successfully eliminating the need for a long, space-inefficient sequential drive-through lane. Additionally, the location offers the convenience and speed advantages of the non-sequential order pick up lane and window to its customers, offering the convenience of picking up orders without exiting the vehicle, and the speed of entering the pick-up lane and approaching the window only when the order is ready, avoiding trapping customers in a lane and requiring them to wait on slow order placement or preparation of large orders.

Example 8

Some embodiments of the present disclosure comprise a plurality of food trucks utilizing one or more ordering systems, the ordering system(s) having a common customer interface. Customers order online, through a mobile device, or at a kiosk, at least by selecting the food truck, and then placing an order with that food truck. The common customer interface passes the order to the individual food truck's ordering system for production queuing, and provides the customer an order-ready time for pick up. The customer can then go to the specified food truck to pick up their food in a non-sequential pick up manner at a given time. Food trucks particularly lend themselves to providing a dedicated pre-order pick up area (such as a window, or part of a large window or bay), as they are typically not drive-through. In some embodiments, having food trucks that move from place to place, the common customer interface provides the customer with the location of the food truck at the time the order is to be picked up.

In such embodiments, customers are able to more fully engage the offerings of food trucks with greater convenience, by not having to find the food truck and peruse the menu at any given time. Instead, the customer can access the food truck's menu electronically, place the order, and then pick up the order at the present location of the food truck. This is particularly useful in crowded cities and areas where food trucks are often popular. Additionally, such embodiments are useful to food trucks to extend their customer base to people who do not have the time to track down the food truck, place an order, and wait for preparation.

Example 9

Some embodiments of the present disclosure comprise a travel center, visitor's bureau, university campus, library, employee lounge, or other common area, having a kiosk, a guest wi-fi with a landing web page, or other such commonly accessed interface. The interface provides a selection of local restaurants to choose from, each having ordering systems providing production timing and slip-logic control of orders, and providing non-sequential order pick up. The ordering systems have a common user interface, or application programming interface that is used by the commonly accessed interface (CAI). A user selects a restaurant on the CAI, and places an order, as discussed elsewhere herein. The CAI provides an order ready (or order delivery, if delivery is chosen) timing estimate which, in preferred embodiments, is generated by the restaurant's ordering system and passed to the CAI to display to the customer. If order pick up is chosen, the CAI provides the customer the restaurant location for pick up.

Such embodiments are particularly useful for customers who wish to quickly access restaurants serving a common area, without having to filter through internet search results, a phonebook, or the like, for a reasonable driving, walking, or delivery time. Additionally, it provides an excellent marketing opportunity for restaurants in an area to make their location and menu accessible to a relatively large, targeted customer base.

Example 10

Some embodiments of the present disclosure may receive as an input the fact that multiple orders are being received from one physical location. Examples for determining that two or more customers are ordering from the same physical location can include identifying the IP address from which each order is made, requesting location data associated with each device placing an order and/or examining the destination address listed for delivery. Some embodiments upon receiving such information may make a determination, based on this information or historical information regarding the ordering habits of the two or more customers, as to whether the orders ought to be grouped together. Additionally, some embodiments may leverage machine-learning algorithms, such as machine learning models or neural networks having one or more hidden layers, to perform the determining process that results in orders being grouped together. In such embodiments, the orders may be assigned the same order code subsequent to determining that the one or more orders ought to be grouped together.

Example 11

In some embodiments, multiple customers may provide other customers in the same ordering group a link or code. The link or code, when entered into a mobile application, may be associated with a pre-grouped order to which each of the customers may add themselves. For example, a pharmaceutical representative wishing to treat the staff of a target doctor's office to lunch and may provide a link associated with a URL or application; each member of the staff then click on the link and place an order to the restaurant associated with the link.

In some embodiments, the link may not originally be associated with any particular restaurant; instead, upon clicking the link, the customers may be prompted with a poll asking them to vote on a pre-selected restaurant. Such voting may be ranked-choice voting, first past the post voting, or any other like voting system. In other embodiments, the list of restaurants may not be pre-selected; instead, the list of restaurants may be generated (or procedurally generated) based on restaurants that are particularly popular that day, that are particular fast that day, that have the highest rate at accurately completing orders, etc. In some embodiments, the organizer may predefine how much money can be spent per meal.

In some embodiments, such information may be displayed to each user. In some embodiments, the cap on how much each of the two or more customers may spend may not be equal among each of the two or more customers. Where an organizer is planning a meal for a birthday party or a celebration with a guest of honor, the organizer may designate a higher threshold amount for the guest of honor than for each of the other two or more customers.

Example 12

Some embodiments of the present disclosure may include marketing incentive opportunities. For example, system administrators may market to a building, such as an office building or apartment complex, as a means of establishing recurring order patterns in an area. In some embodiments, such marketing may involve financially incentivizing one or more customers to order via reducing the overall cost of the order by a fixed amount or a fixed percentage of the overall price or a fixed percentage of the overall price up to a certain amount. As another example, in some embodiments, the present disclosure can involve giving a company a deadline for group ordering along with an associated code. In such an embodiment, if the company uses the code for a group order by the deadline, the restaurant providing the marketing incentive can offer perks, such as free delivery, based on the use of a group ordering feature.

Example 13

Some embodiments of the present disclosure comprise group ordering system to be used at a business center, multi-office building, skyscraper, structure that houses multiple independent entities, or other such entity-hosting structure. In such an embodiment, the group order functionality can be utilized by a variety of customers, all located in the multiple businesses or entities that are located in or at the same approximate address. The employees, agents, workers, staff, or other customers operating out of the location can input contact information and customer characteristics pertaining to their location. After doing so, in some embodiments, the customer may receive a notification of the existence of a pre-set group order for the area. If the customer so chooses, the customer can join the preset group. In some embodiments, the customer will have until a pre-determined time in the day to place an order as a part of the group order. In such an embodiment, once the pre-determined time arises the group order will be closed for modification or additional orders. One illustration of the present example is that each of the customers in an office building may input a recurring code that is linked to a group order to be delivered to the office building, even if the customers work for separate companies with offices in the office building. In this example, the input of recurring code allows the customer to join a single building-wide group order. Accordingly, when the customer places an order for food, it is prepared, picked up, and delivered with the other menu selections made by other customers in the group order. When the group order is placed, even though the customer can pay for his or her meal individually, the restaurant can receive the group order information as a single order. In this embodiment, the restaurant can execute the order as if it was placed off a single device. By joining the group order, the customer can avoid paying separate delivery fees, as a single delivery driver can bring over all of the orders in the group order to a designated drop off location that is convenient for the customers in the group. In some embodiments, the customer that joins the group order for the office building can avoid paying delivery fees altogether. Further, in this example, the customer will know exactly when and where his or her food will arrive each day.

Example 14

Some embodiments of the present disclosure comprise group ordering system to be used at apartment complexes, dormitories, multi-family homes, or other living structures that house more than one individual that may place a mobile order. In some embodiments, the residents living in the specific building can input contact information and customer characteristics relaying to the system that the customer lives at or near a particular address associated with a group order. After doing so, in some embodiments, the customer may receive a notification of the existence of a pre-set group order for the location. If the customer so chooses, the customer can join the preset group. In some embodiments, a management group or university system may be able to utilize the group order system to host events for the residents. In some embodiments, the residents may be able to join a group order that delivers food to one particular location in the building, complex, community, or dormitory at a preset time. Similar to Example 13, by joining the group order, the customer can avoid paying separate delivery fees. In some embodiments, the customer that joins the group order for the residential community can avoid paying delivery fees altogether. Further, in this example, the customer will know exactly when and where his or her food will arrive each day.

CONCLUSION

The disclosure claimed has been herein disclosed sufficiently for persons skilled in the art to comprehend and practice. While the disclosure may be susceptible to various modifications and alternative forms, specific embodiments have been shown by way of example in the drawings and have been described in detail herein. The various embodiments, examples, and illustrations disclosed herein, while representing the best and various alternative modes of carrying out the disclosure as currently contemplated by the inventors, are by no means limiting or exhaustive, but serve as an aid to comprehending the full nature and scope of the disclosure.

It should be understood that the disclosure is not intended to be limited to the particular forms disclosed. Rather, the disclosure is to cover all modifications, equivalents, and alternatives falling within the spirit and scope of the disclosure as defined by the following appended claims. Various other embodiments will become apparent which fall within the scope of this disclosure and claims.

It should be noted that section titles or headers are provided for convenience only, and are not to be taken as limiting the scope of the descriptions thereunder The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid-state drives, and optical data storage devices. The computer readable medium can also be distributed over network-coupled computer systems so that the computer readable code is stored and executed in a distributed fashion.

Consistent with the above disclosure, the examples of systems and method enumerated in the following clauses are specifically contemplated and are intended as a non-limiting set of examples.

Clause 1. A computer-implemented method including receiving, by a computing device, over a network, one or more contact information pertaining to one or more customers; receiving a selection of a restaurant to initiate an order for the one or more customers; transmitting, via the computing device and based on the one or more contact information, one or more notifications to one or more customer computing devices associated with the one or more customers, where the one or more notifications comprises a prompt to at least a menu associated with the restaurant; receiving, by the computing device, one or more selections of items ordered from the menu associated with the restaurant; and transmitting, by the computing device, the one or more selections of items included in the order to a computing device associated with the restaurant to cause the items to be prepared.

Clause 2. The computer-implemented method of any foregoing clause, where the one or more selections of items are ordered in parallel by the one or more computing devices associated with the one or more customers.

Clause 3. The computer-implemented method of any foregoing clause, further including receiving a cutoff time for when the order must be placed; and disabling an ability to modify the order after the cutoff time.

Clause 4. The computer-implemented method of any foregoing clause, further including receiving a selection relating to designating the order as a pickup order or a delivery order.

Clause 5. The computer-implemented method of any foregoing clause, further including determining a property of the one or more customers; and limiting one or more items associated with the menu based on the property of the one or more customers.

Clause 6. The computer-implemented method of any foregoing clause, further including receiving a time selection for the items to be prepared; and transmitting the time selection to the computing device associated with the restaurant to cause the items to be prepared at the time.

Clause 7. The computer-implemented method of any foregoing clause, further including transmitting, by the computing device, a location and timeframe at which the restaurant is going to deliver the items to a website or an application; and receiving, from the one or more customer computing devices, one or more confirmation messages indicating the one or more customers will be at the location and the timeframe to pick up the items.

Clause 8. The computer-implemented method of any foregoing clause, where the one or more customers are members of a family.

Clause 9. The computer-implemented method of any foregoing clause, where the one or more customers are associated with one or more entities.

Clause 10. A non-transitory, computer-readable medium storing instructions that, when executed, cause a processing device to: receive, over a network, one or more contact information pertaining to one or more customers; receive a selection of a restaurant to initiate an order for the one or more customers; transmit, based on the one or more contact information, one or more notifications to one or more customer computing devices associated with the one or more customers, wherein the one or more notifications comprises a prompt to at least a menu associated with the restaurant; and receive one or more selections of items ordered from the menu associated with the restaurant; and transmit the one or more selections of items included in the order to a computing device associated with the restaurant to cause the items to be prepared.

Clause 11. The computer-readable medium of any foregoing clause, where the one or more selections of items are ordered in parallel by the one or more computing devices associated with the one or more customers.

Clause 12. The computer-readable medium of any foregoing clause, where the processing device is further to: receive a cutoff time for when the order must be placed; and disable an ability to modify the order after the cutoff time.

Clause 13. The computer-readable medium of any foregoing clause, where the processing device is further configured to receive a selection relating to designating the order as a pickup order or a delivery order.

Clause 14. The computer-readable medium of any foregoing clause, where the processing device is further configured to: determine a property of the one or more customers; and limit one or more items associated with the menu based on the property of the one or more customers.

Clause 15. The computer-readable medium of any foregoing clause, where the processing device is further configured to: receive a time selection for the items to be prepared; and transmit the time selection to the computing device associated with the restaurant to cause the items to be prepared at the time.

Clause 16. The computer-readable medium of any foregoing clause, where the processing device is further configured to: transmit a location and timeframe at which the restaurant is going to deliver the items to website or an application; and receive, from the one or more customer computing devices, one or more confirmation messages indicating the one or more customers will be at the location and the timeframe to pick up the items.

Clause 17. A system including a memory device storing instructions; a processing device communicatively coupled to the memory device, wherein the processing device executes the instructions to: receive, over a network, one or more contact information pertaining to one or more customers; receive a selection of a restaurant to initiate an order for the one or more customers; transmit, based on the one or more contact information, one or more notifications to one or more customer computing devices associated with the one or more customers, wherein the one or more notifications comprises a prompt to at least a menu associated with the restaurant; and receive one or more selections of items ordered from the menu associated with the restaurant; and transmit the one or more selections of items included in the order to a computing device associated with the restaurant to cause the items to be prepared.

Clause 18. The system of any foregoing clause, where the one or more selections of items are ordered in parallel by the one or more computing devices associated with the one or more customers.

Clause 19. The system of any foregoing clause, where the processing device is further configured to: receive a cutoff time for when the order must be placed; and disable an ability to modify the order after the cutoff time.

Clause 20. The system of any foregoing clause, where the processing device is further configured to receive a selection relating to designating the order as a pickup order or a delivery order.

I claim:

1. A computer-implemented method comprising:
   receiving, by a computing device, over a network, one or more contact information pertaining to one or more customers;
   receiving a selection of a restaurant to initiate an order for the one or more customers;
   transmitting, via the computing device and based on the one or more contact information, one or more notifications to one or more customer computing devices associated with the one or more customers, wherein the one or more notifications comprises a prompt to at least a menu associated with the restaurant;
   receiving, by the computing device, one or more selections of items ordered from the menu associated with the restaurant; and
   transmitting, by the computing device, the one or more selections of items included in the order to a computing device associated with the restaurant to cause the items to be prepared.

2. The computer-implemented method of claim 1, wherein the one or more selections of items are ordered in parallel by the one or more computing devices associated with the one or more customers.

3. The computer-implemented method of claim 1, further comprising:
   receiving a cutoff time for when the order must be placed; and
   disabling an ability to modify the order after the cutoff time.

4. The computer-implemented method of claim 1, further comprising receiving a selection relating to designating the order as a pickup order or a delivery order.

5. The computer-implemented method of claim 1, further comprising:
determining a property of the one or more customers; and
limiting one or more items associated with the menu based on the property of the one or more customers.

6. The computer-implemented method of claim 1, further comprising:
receiving a time selection for the items to be prepared; and
transmitting the time selection to the computing device associated with the restaurant to cause the items to be prepared at the time.

7. The computer-implemented method of claim 1, further comprising:
transmitting, by the computing device, a location and timeframe at which the restaurant is going to deliver the items to a web site or an application; and
receiving, from the one or more customer computing devices, one or more confirmation messages indicating the one or more customers will be at the location and the timeframe to pick up the items.

8. The computer-implemented method of claim 1, wherein the one or more customers are members of a family.

9. The computer-implemented method of claim 1, wherein the one or more customers are associated with one or more entities.

10. A non-transitory, computer-readable medium storing instructions that, when executed, cause a processing device to:
receive, over a network, one or more contact information pertaining to one or more customers;
receive a selection of a restaurant to initiate an order for the one or more customers;
transmit, based on the one or more contact information, one or more notifications to one or more customer computing devices associated with the one or more customers, wherein the one or more notifications comprises a prompt to at least a menu associated with the restaurant; and
receive one or more selections of items ordered from the menu associated with the restaurant; and
transmit the one or more selections of items included in the order to a computing device associated with the restaurant to cause the items to be prepared.

11. The computer-readable medium of claim 10, wherein the one or more selections of items are ordered in parallel by the one or more computing devices associated with the one or more customers.

12. The computer-readable medium of claim 10, wherein the processing device is further configured to:
receive a cutoff time for when the order must be placed; and
disable an ability to modify the order after the cutoff time.

13. The computer-readable medium of claim 10, wherein the processing device is further configured to receive a selection relating to designating the order as a pickup order or a delivery order.

14. The computer-readable medium of claim 10, wherein the processing device is further configured to:
determine a property of the one or more customers; and
limit one or more items associated with the menu based on the property of the one or more customers.

15. The computer-readable medium of claim 10, wherein the processing device is further configured to:
receive a time selection for the items to be prepared; and
transmit the time selection to the computing device associated with the restaurant to cause the items to be prepared at the time.

16. The computer-readable medium of claim 10, wherein the processing device is further configured to:
transmit a location and timeframe at which the restaurant is going to deliver the items to web site or an application; and
receive, from the one or more customer computing devices, one or more confirmation messages indicating the one or more customers will be at the location and the timeframe to pick up the items.

17. A system comprising:
a memory device storing instructions;
a processing device communicatively coupled to the memory device, wherein the processing device executes the instructions to:
receive, over a network, one or more contact information pertaining to one or more customers;
receive a selection of a restaurant to initiate an order for the one or more customers;
transmit, based on the one or more contact information, one or more notifications to one or more customer computing devices associated with the one or more customers, wherein the one or more notifications comprises a prompt to at least a menu associated with the restaurant; and
receive one or more selections of items ordered from the menu associated with the restaurant; and
transmit the one or more selections of items included in the order to a computing device associated with the restaurant to cause the items to be prepared.

18. The system of claim 17, wherein the one or more selections of items are ordered in parallel by the one or more computing devices associated with the one or more customers.

19. The system of claim 17, wherein the processing device is further configured to:
receive a cutoff time for when the order must be placed; and
disable an ability to modify the order after the cutoff time.

20. The system of claim 17, wherein the processing device is further configured to receive a selection relating to designating the order as a pickup order or a delivery order.

* * * * *